United States Patent
Soljanin et al.

(10) Patent No.: US 7,669,103 B2
(45) Date of Patent: Feb. 23, 2010

(54) ENCODED TRANSMISSION

(75) Inventors: Emina Soljanin, Chatham, NJ (US);
Nedeljko Varnica, Santa Clara, CA (US); Philip Alfred Whiting, Union, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 653 days.

(21) Appl. No.: 11/418,158

(22) Filed: May 3, 2006

(65) Prior Publication Data

US 2007/0260957 A1    Nov. 8, 2007

(51) Int. Cl.
*H03M 13/35* (2006.01)
(52) U.S. Cl. ...................... 714/751; 714/774
(58) Field of Classification Search ............... 714/774, 714/776, 751
See application file for complete search history.

(56) References Cited

U.S. PATENT DOCUMENTS

| | | | | |
|---|---|---|---|---|
| 6,801,532 B1 * | 10/2004 | Anandakumar et al. | ...... | 370/394 |
| 7,158,473 B2 * | 1/2007 | Kurobe et al. | ............... | 370/204 |
| 7,295,549 B2 * | 11/2007 | Pepin et al. | .................. | 370/352 |
| 7,426,241 B2 * | 9/2008 | Proctor, Jr. | .................. | 375/265 |

OTHER PUBLICATIONS

Etesami, O & Shokrollahi, A. Raptor Codes on Symmetric Channels.
Jin, H & McEliece, Coding Theorems for Turbo Code Ensembles. IEEE Transactions on Information Theory, 48(6), Jun. 2002, pp. 1451-1461.
Litsyn, S. & Shevelev, V. Distance Distributions in Ensembles of Irregular Low-Density Parity Check Codes. IEEE Trans on Info Theory, 49 (12) Dec. 2002, pp. 3140-3159.
Litsyn, S. & Shevelev, V. On Ensembles of Low-Density Parity Check Codes: Asymptotic Distance Dist. IEEE Trans on Infor Theory 48(4) Apr. 2002, pp. 887-908.
Shokrollahi, A. Raptor Codes. Digital Founatin Technical Report DF2003-06-01.
Soljanin, E., Liu, R., & Spasojevic, P. Hybrid ARQ with Random Transmission Assign. DIMACS Series in Discrete Math. 66, 2004, pp. 321-334.
Soljanin, E. Hybrid ARQ in Wirelss Networks. DIMACS Workshop on Network Information Theory, Mar. 2003.

* cited by examiner

*Primary Examiner*—Stephen M Baker
(74) *Attorney, Agent, or Firm*—Hitt Gaines PC

(57) ABSTRACT

Significant improvement in Raptor codes and punctured LDPC codes are obtainable by use of the invention. In both a transmission scheme for Raptor-encoded or LDPC-encoded information, a dynamic adjustment approach is employed. A fraction of a codeword or information frame is transmitted. A feedback signal is sent from the receiver to the transmitter indicating either 1) successful decoding, or 2) failure to decode and/or a feedback signal indicative of a statistical measure of transmission channel quality. If decoding fails, a further portion of the codeword or frame is sent. The intensity and/or size of the fraction is adjusted based on the feedback signal. In one embodiment, a specific range for probabilities employed in the encoding process for Raptor codes provides the ability to increase transmission throughput. Further it has been found that the advantageous Raptor codes are useful in noise conditions where even the improved punctured LDPC codes of the invention begin to degrade.

22 Claims, 9 Drawing Sheets

ENCODED TRANSMISSION

TECHNICAL FIELD

This invention relates to communication such as wireless communication and in particular coding in such communication.

BACKGROUND OF THE INVENTION

In wireless systems messages, i.e. a sequence of symbols drawn from a signaling set, are transmitted in coded form. That is, the message is reduced to binary symbols in a series of codewords. The codewords are grouped into frames that are ultimately transmitted. The process of converting a message into a frame or series of frames for transmission is generally denominated coding.

Since any wireless network is subject to noise and other conditions (e.g. interference) influencing the transmitted signal, frames are often not received, are sufficiently distorted so that the encoded message cannot be decoded, or are decoded incorrectly. A failure to decode is recognized by detection algorithms, such as special parity check algorithms, that operate on a series of parity symbols derived from and appended to the transmitted codewords. Some errors in a received frame are correctable using error correction algorithms. To address the remaining uncorrected errors, expedients such as automatic repeat request (ARQ) schemes are employed. In these approaches, if a frame is not received or an unresolvable error is detected at the receiver, a message (generally denominated a negack) is sent to the transmitter requesting retransmission.

Many coding techniques have been developed for transforming a message into a frame or series of frames that has a further improved probability of reception and correct decoding. One such approach has been denominated low density parity codes (LDPC)—a class of linear block codes. In LDPC, the binary symbols representing a message are each associated with a variable node. Thus as shown in the illustrative LDPC code of FIG. 1, eight variable nodes ($c_1$ through $c_8$) are present. Each variable node corresponds to one bit of a codeword. Message bits (in a systematic code) or bits representing the message (in a non-systematic code) are associated with a portion (less than all) of the variable nodes, e.g. $c_2$, $c_4$, $c_6$, and $c_7$. Accordingly, in the example of FIG. 1, four message bits $z_1$ through $z_4$ are associated respectively with $c_2$, $c_4$, $c_6$, and $c_7$. (There are more variable nodes than message bits to provide the redundancy needed for error correction.) The chosen number of variable nodes is correlated with a chosen number of check nodes. Thus in the example of FIG. 1 there are four check nodes $f_1$ through $f_4$, and as shown by connecting lines, four check nodes are associated with each variable node. Similarly, each check node in the example is associated with four variable nodes. A LDPC code is classified by the number of variable nodes and check nodes employed in the scheme as well as the number of, and identity of, variable nodes associated with each check node, and the number of check nodes associated with each variable node. The scheme of FIG. 1 is further denominated regular, as contrasted to irregular, since the number of variable nodes associated with each check node is the same for each check node and the number of check nodes associated with each variable node is also the same for each variable node.

The LDPC coding scheme also requires that only a defined codeword be transmitted. A word is a codeword only if it has an appropriate length (8 bits in the example) and satisfies specific parity checks, i.e., the sum modulo 2 at each check node of the associated variable nodes is 0 (or some other fixed value). (Thus for an eight variable node, 4 check node scheme there are at least $2^8/2^4=16$ codewords.) In the illustration of FIG. 1 the sum of check nodes $c_1$, $c_3$, $c_4$, and $c_8$ (those associated with $f_1$) is 0. Similarly the corresponding sum at each other check node is zero. For example, in systematic codes a subset of the variable nodes corresponds to the information bits and the remaining transmitted bits of the codeword are chosen to make the parity checks consistent.

It is, however, desirable to transmit the fewest number of bits that yield upon reception an acceptable error rate. For LDPC codes a puncturing approach is often employed to increase transmitted bit rate while maintaining an acceptable error rate. In puncturing only a portion of a LDPC codeword sequence is transmitted at each transmission interval. Thus FIG. 2 shows a sequence of transmission intervals (22 through 25) for codeword 21. The bit sequence 21 is parsed and a portion 22 is transmitted. If such transmission is sufficient to allow decoding, the next sequence is addressed. If the receiver is unable to discern the message, a further portion 23 of the first sequence is transmitted. The cycle is continued for example by sending portion 24 in a third transmission and if needed portion 25 in a fourth transmission until the sequence is decoded at the receiver. The number of bits in each transmission, the particular bits chosen for transmission, and the signal intensity of such transmission is adjusted to yield the desired performance for the scheme.

The use of LDPC codes with puncturing has proven beneficial for the transmission of wireless messages. Nevertheless, not all LDPC codes perform equally well. (The typical metric of performance is throughput as measured by the average number of user data bits accepted at the receiver in the time required for transmission of a single bit.) Generally irregular LDPC codes after optimization perform better than regular codes. However, among irregular codes performance varies greatly. Additionally, the computational complexity involved in decoding varies substantially among such codes. As a further complicating factor, LDPC codes generally do not perform well on transmission channels having substantial interference and fail when the capacity of the channel is smaller than the rate of the code.

Various other codes have been developed in the hope of improving throughput. One such robust class designed for, and most often applied to, optical communication systems is Raptor codes. Such codes have been thought to have the potential for performing better than LDPC codes when the communication channel is noisy. In a Raptor code an LDPC or turbo (as described in Raptor Codes, Amin Shokrollahi Digital Fountain Technical Report DF-2003-06-001) codeword is further encoded. A probability, $\Omega_d$ is assigned to each integer, d, where d corresponds to an integer from 1 to the number of bits in the LDPC codeword frame. A series of numbers, d, is chosen before each codeword frame transmission. The choosing algorithm is designed such that the likelihood of choosing a specific number is commensurate with its assigned probability. The number d, chosen is employed as the number of distinct bits of the LDPC codeword sequence chosen at random that are summed with subsequent transmission of such sums in a stream. Since the transmitter and receiver are synchronously running the same version of a random number generator for d, the receiver knows the sequence of d's chosen at the transmitter and which corresponding d bits of the LDPC code bits are chosen. With the knowledge of the chosen d, decoding is attempted upon reception.

In a Raptor scheme, the likelihood of decoding depends on the parameters of 1) signal transmission intensity, and 2) the transmitted number of bits (representing sums) per underlying LDPC frame. If decoding is not achieved for the parameter chosen, a new series of sums are formed for the non-decoded bits by choosing a new series of d's. The process of choosing a series of d's as well as a corresponding number of bits and sending the corresponding sums is continued until reception and decoding is accomplished.

Thus in the Raptor approach puncturing is not employed. Instead, an expedient involving assigned probabilities is used. The efficacy of the chosen Raptor code scheme depends on a variety of variables. For example, the chosen set of $\Omega_d$s, the underlying LDPC code, transmission intensity and the frame size all affect the effectiveness of the code.

SUMMARY OF THE INVENTION

It is possible to improve transmission throughput by dynamically adjusting transmission parameters in response to feedback from the receiver of information providing a measure of statistical channel quality. For example, in a punctured LDPC transmission in each transmission interval the power of the transmission and/or the fraction of codeword bits transmitted is dynamically adjusted in response to a receiver feedback signal indicative of the SNR at the receiver and/or the bit erasure rate.

Similarly, in another embodiment of the invention, a Raptor code frame is transmitted in intervals. In a particular interval 1) the power employed in, and 2) the fraction of the frame bits transmitted is dynamically adjusted based on a feedback signal that is indicative of statistical signal quality. Additionally, the throughput of a transmitted Raptor code is improved, especially in the presence of dynamic adjustment responsive to feedback, by a judicious choice of $\Omega_d$'s.

Thus in accordance with another embodiment of the invention, Raptor codes are adapted for efficient encoding and transmission, i.e. throughput within 30% of the Shannon limit by an appropriate choice of $\Omega_d$'s. The Shannon limit is defined by:

$$p(y) = \left[\frac{1}{2\sqrt{2\pi}}\right]\left[e^{-(y+\sqrt{v})^2/2} + e^{-(y-\sqrt{v})^2/2}\right]$$

where $v$ is the signal-to-noise ratio, so that the Shannon capacity (in bits) for BPSK (Binary Phase Shift Keying) using the alphabet $-1, 1$ is:

$$C(v) = \left[\int_{-\infty}^{\infty} p(y)\log_2 p(y)dy\right] - \frac{1}{2}\log_2(2\pi e)$$

This adaptation of $\Omega_d$'s depends on maximizing through linear programming over X and over all choices of $\Omega$ (consistent with the constraints) the minimum value of K satisfying the inequality:

$$K \leq -\frac{\Omega'(1-X)}{\log X} \text{ with } \Omega'(X) = \sum_{d=1}^{D} d\Omega_d X^{(d-1)} \quad \text{formula (1)}$$

together with the constraints that $\Omega_d$ is greater than or equal to 0, $\Omega_1$ is much less than 1, and the sum of all $\Omega_d$ is equal to 1. (In formula (1) d, as defined previously is the number of randomly chosen variable node bits to be summed, D is the number of bits in the codeword, and X is a number in the interval from p to 1 inclusive, where p is the fraction of bit erasures that on average is decodable from the underlying LDPC code with the algorithm, such as belief propagation decoding, being employed in the communication system.)

As discussed, irrespective of the specific $\Omega_d$ choice, use of a Raptor code in a hybrid ARQ system is used with particular advantage through dynamically responding to a feedback signal with retransmission at a responsive signal intensity with a responsive number of bits. Such intensity and transmitted bit number are determined in an advantageous embodiment by the condition:

$$R_j(1-\gamma(j)) > \frac{c_0}{\prod_\Omega} - \sum_{i=1}^{j-1} R_i(1-\gamma(i)) \quad \text{formula (2)}$$

with $$\prod_\Omega = \min_\theta \frac{P(\theta)}{\theta}$$

and $$P(\theta) = \sum_d \Omega_d \sum_{\substack{j=1 \\ j \text{ odd}}}^{d} \binom{d}{j}\theta^j(1-\theta)^{d-j}$$

where Rj is the number of summed bits sent in the jth interval directed by the number of bits in the underlying LDPC code frame, $\gamma(j)$ is the Bhattacharyya noise on the channel during the jth transmission attempt, $c_0$ is a parameter defined infra, and $P(\theta)$ is the probability of obtaining a 1 for transmission in the Raptor code for a codeword of fractional weight $\theta$. Most of these variables are determinable before operation. However, the variable $\gamma(j)$ is derivable from the channel quality information obtained from the feedback signal. The values for intensity and transmitted bit number used in actual code transmission should typically be within 25 percent of values derivable from formula (2).

It is also possible to improve the efficacy to at least 30% of the Shannon limit of a punctured LDPC encoding scheme in wireless communications by a dynamic choice of 1) transmitted power and 2) fraction of frame bits transmitted in each interval of the puncturing scheme based on a feedback signal. In one advantageous embodiment, the formula:

$$\alpha_j > 1 - e^{-c_0} - \sum_{i=1}^{j-1} \alpha(i)(1-\gamma(i)) \quad \text{formula (3)}$$

yields suitable values where $c_0$ is a constant determined by the choice of LDPC scheme, $\gamma(j)$ is the Bhattacharyya noise after the $j^{th}$ transmission and $\alpha_j$ is the fraction of bits sent in the $j^{th}$ interval of the puncturing transmission. Since $\gamma(j)$ is dependent on the transmission power that is derived from the feedback signal formula (3) yields a boundary condition for both the power employed and the fraction of bits transmitted during a specific puncturing interval. Generally deviations of 25 percent from the values derivable from formula (3) still yield advantageous results.

Although by use of the invention Raptor codes are adapted with particular advantage to wireless communication networks, the channel condition of such network determines if use of punctured LDPC is, nevertheless, more advantageous. Generally use of a punctured LDPC approach is preferable for channels having relatively high SNR's. The improved Raptor codes of the invention, significantly, operate efficiently at SNR levels that preclude punctured LDPC use.

DETAILED DESCRIPTION

Figure 4:
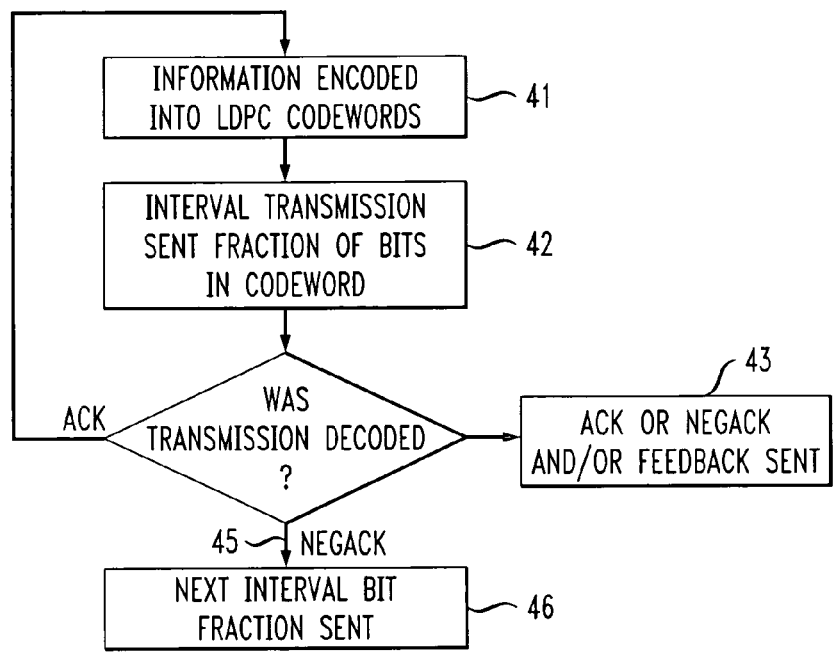
FIG. 4 and FIG. 5 are flow charts relating to the invention.
Figure 5:
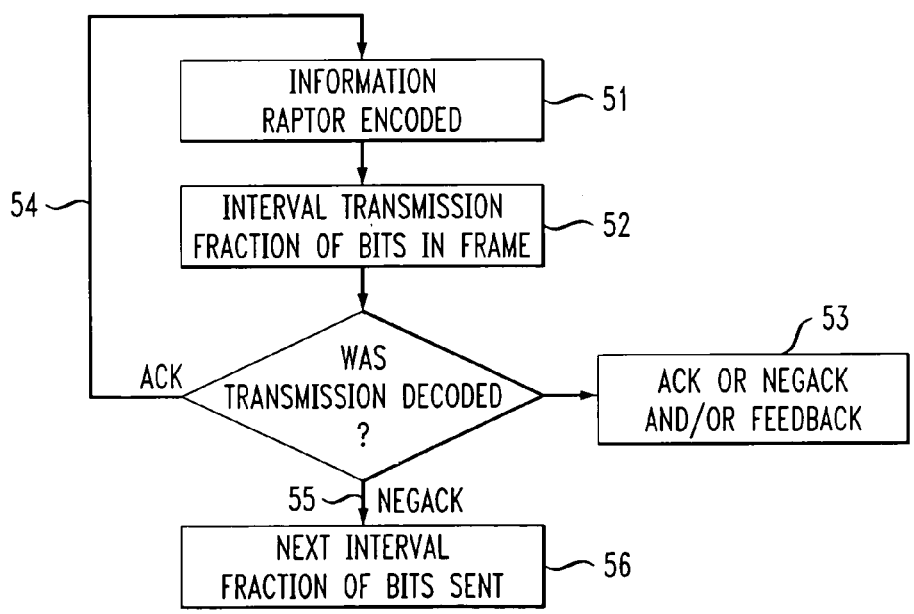

The invention involves methods associated with punctured LDPC or Raptor code transmission. In punctured LDPC during a series of transmission intervals a portion of a codeword is sent. Thus, as shown in FIG. 4, information is encoded, 41, into a series of codewords. In a first interval, 42, a fraction of bits in the first codeword is transmitted. The receiver attempts to decode the codeword, 43, based on the first interval transmission. If decoding is successful, an ack message is sent and the procedure recycles, 44, to step 41 or, 42 for the first transmission interval on the next codeword. If decoding fails, a negack message is sent together with a feedback signal that is indicative of the transmission channel quality.

A measure of channel quality is a quantity that is relatable to the probability that a transmission is received and the received transmission decoded. Exemplary of a measure of channel quality is the signal-to-noise ratio measured at the receiver. Alternatively, another measure is the fraction of codeword bits that are not discerned by the receiver after appropriate processing.

If a negack and/or a feedback signal indicative of channel quality is received, a transmission of a further fraction of the codeword bits is sent during a second interval. The transmission power and/or the fraction of codeword bits transmitted are adjusted based on the feedback signal and the second interval transmission at 46 is sent. The transmission is answered with either 1) an ack, or 2) a negack and/or a feedback signal. The sequence is continued until the codeword is decoded at the receiver or a decision to continue on to the next codeword is made.

A similar inventive approach is taken for transmitting Raptor encoded information. A frame of information (generally 100 to 10,000 bits) is encoded at 51. In a first transmission interval, 52, a fraction of the frame bits are sent. In an analogous manner to the LDPC approach, the receiver sends back at 53 either 1) an ack, or 2) a negack and/or signal feedback that is a measure of the channel quantity. If ack is received, the process at 54 is begun on the next frame. If a negack with a feedback signal, 55, is received, a transmission in the next interval is prepared. The power and/or fraction of frame bits to be transmitted is chosen at 56 based on the feedback signal. The transmission intervals are continued with feedback until decoding of the frame is achieved or it is decided to continue to the next frame.

Thus in either Raptor or punctured LDPC, the power and/or bit fraction is dynamically adjusted at least during some intervals based on feedback that is a measure of channel quality. By such dynamic adjustment, it is possible to achieve a throughput that is within 35%, preferably 20%, most preferably within 10% of the Shannon limit. Thus, for example, the information transmission rate, or power level, is increased in response to a feedback signal indicating an increase in SNR or decrease in the symbol erasure rate. Similarly the information transmission rate or power level is decreased in response to a feedback signal indicating a decrease in SNR or increase in the signal erasure rate.

In a specific embodiment relating to Raptor codes, throughput is enhanced by using one or both of two expedients. The first expedient, whether or not dynamic adjustment is employed, involves a suitable choice of $\Omega_d$'s. In particular, these $\Omega_d$'s are derivable by using linear programming to maximize over X and over all choices of $\Omega$, the value of K constrained as follows:

$$K \leq -\frac{\Omega'(1-X)}{\log X} \text{ with } \Omega'(X) = \sum_{d=1}^{D} d\Omega_d X^{(d-1)} \quad \text{formula (1)}$$

(In the above formula d is the number of randomly chosen variable nodes to be summed, D is the number of bits in the codeword, and X is a number in the interval from p to 1 inclusive where p is the maximum fraction on average of bit erasures of the underlying LDPC code decodable with the algorithm such as belief propagation decoding, being employed in the communication system.) Additionally, this formula has the further constraints that the sum of the $\Omega_d$'s equal 1 and all $\Omega_d$'s are greater than or equal to 0. It is possible to use conventional linear programming algorithms such as the simplex algorithm or Karmarkar algorithm to achieve such solution.

Generally, a solution is obtainable using about 100 or more inequality equations. Each such inequality is obtainable by substituting a different value of X into formula (1). Thus, for example, in one embodiment values are chosen to divide the interval into 100 equal parts. Nevertheless, values of X need not necessarily be chosen by an equal partition of the interval. Although about 100 or more inequalities is typically adequate to derive an acceptable solution, use of significantly more inequalities, typically up to 1000, is not precluded. Although use of more than 1000 inequalities is acceptable, the obtained results generally do not justify the additional computation time.

In implementing the inventive Raptor codes, it is not necessary to use precisely the values derived. Improvement over conventional encoding systems is still obtainable if the $\Omega_d$'s vary from values derivable from formula (1). Typically, it is possible to modify $\Omega_d$'s corresponding to derivable values of 0.05 or less by plus or minus 30 percent from the derivable values. Similarly, for $\Omega_d$'s greater than 0.05 variations up to plus or minus 10 percent are acceptable.

In any Raptor code, as previously discussed, bits are randomly chosen from the underlying LDPC encoded information and as discussed such sums are transmitted. The signal intensity used for such transmission and the number of sums transmitted for each underlying LDPC frame encoded to a corresponding Raptor frame both affect code efficiency. In a second expedient for improving a Raptor code, dynamic adjustment is employed. In an advantageous embodiment, choice of intensity and fraction of summed bits transmitted are guided by formula (2):

$$R_j(1-\gamma(j)) > \frac{c_0}{\Pi_\Omega} - \sum_{i=1}^{j-1} R_i(1-\gamma(i)) \quad \text{formula (2)}$$

In this formula, $R_j$ is the number of summed bits sent in the $j^{th}$ interval divided by the number of bits in the underlying LDPC code frame, $\gamma(j)$ is the Bhattacharyya noise on the channel during the jth transmission attempt, $c_0$ (to be defined infra) is a parameter dependent on the code weight spectrum and $\Pi_\Omega$ is defined by:

$$\Pi_\Omega = \min_\theta \frac{P(\theta)}{\theta} \quad \text{formula (5)}$$

where $p(\theta)$ is the probability of obtaining a 1 for transmission in the Raptor code for a codeword of fractional weight, $\theta$, and is obtained as:

$$P(\theta) = \sum_d \Omega_d \sum_{j=1, j \text{ odd}}^d \binom{d}{j} \theta^j (1-\theta)^{d-j} \quad \text{formula (6)}$$

with d defined as before, and $\binom{d}{j}$ is the standard definition of d-choose-j.

Significantly, most parameters are determinable without feedback. However, the $\gamma(j)$ is a quantity that is dynamically determinable from the feedback measure of channel quality. For example, $\gamma(j)$ is dependent on the SNR through the relation $\gamma = e^{-P/2\sigma^2}$ where P is received signal power and a $\sigma^2$ is the channel noise power. Additionally, $R_j$ is a measure of the amount of redundancy present in the bits transmitted. (Redundancy in this context is defined as one minus the number of information bits in a codeword divided by the total number of bits in the codeword.) Thus by solving formula (2) using information including that obtained from the feedback signal, advantageous values are determinable for the transmission intensity as reflected in $\gamma(j)$ and for the number of bits as reflected in $R_j$. It is possible to use, in implementation, values of $R_j$ that vary by ±25%, preferably ±10% from values derivable from formula (2) as well as values of $\gamma(j)$ that vary by ±25% preferably ±10% from the values derivable from formula (2). (This deviation percentage is not applied to a logarithmic measure such as decibels but rather to the absolute value derived, for example, from the decibel value.)

In practice, as previously discussed, the Raptor code frame is transmitted during the first interval. If upon reception decoding is not possible a second transmission is made using the values as discussed above with the transmission attempt, j, equal to 2. Similarly, if the second transmission is not decodable a third transmission attempt is made with the intensity of transmission and the number of Raptor bits transmitted using the above technique with j equal to 3. The procedure continues until decoding is accomplished or further transmission is not desirable.

In accordance with the applicant's invention it is not only possible to improve Raptor codes but also possible to improve the performance of LDPC codes using a dynamic feedback puncturing technique. In this technique the transmitted power and/or the fraction of LDPC frame bits transmitted in each puncturing interval is dynamically controlled. Advantageous values of intensity and fraction of LDPC frame bits are derivable from the feedback information using the formula:

$$\alpha_j > 1 - e^{-c_0} - \sum_{i=1}^{j-1} \alpha(i)(1-\gamma(i)) \quad \text{formula (3)}$$

where $\alpha_j$ is the fraction of bits sent in the jth interval of the puncturing transmission, $c_0$ is the same parameter as employed in formula (2) (to be defined infra), and $\gamma(j)$ is the Bhattacharya noise after the jth transmission. Thus formula (3) yields a boundary condition for power employed and fraction of bits transmitted during the jth interval of puncturing based on feedback. In particular $\gamma(j)$ is derivable from a measure of statistical channel quality. For example, the transmission power is related to SNR through the relation $\gamma = e^{-P/2\sigma^2}$ as defined supra. Additionally, $\alpha_j$ is directly the fraction of bits transmitted. Generally any combination of $\gamma(j)$ and $\alpha_j$ that satisfy the boundary conditions is useful. The values chosen from such range are dependent on the objectives for the transmission system. Higher power levels generally cause greater interference to neighboring mobile units while the transmission of a higher fraction of codeword bits reduces the information transmission rate. As a countervailing consideration higher intensities and higher transmitted bit fraction yield a significantly greater probability of successful decoding. Thus a balancing of generated interference relative to transmission rate and relative to likelihood of successful reception is required. Typically in circumstances where additional interference is unacceptable lower transmission intensities are used in conjunction with a lower fraction of transmitted bits. One such situation is where nearby communications are operating close to their interference limit. Conversely, in circumstances where transmission rate is not critical and interference is not a perceived problem higher intensities and higher bit fraction transmission is employable. Exemplary of such situations is where the communication is taking place in a dedicated band, generally, for isolated point-to-point communication.

As discussed the values used depend on the acceptable range of parameters derived from formula (3) and goals of the transmission system. However, the operation parameters employed need not be precisely in the range of derivable values for $\alpha_j$ and $\gamma(j)$ determined from formula (3). It is generally acceptable to deviate from the values derivable from formula (3) by 10 percent. Typically such deviation generally does not unacceptably degrade the improvement in system efficacy that is achievable.

Figure 1:
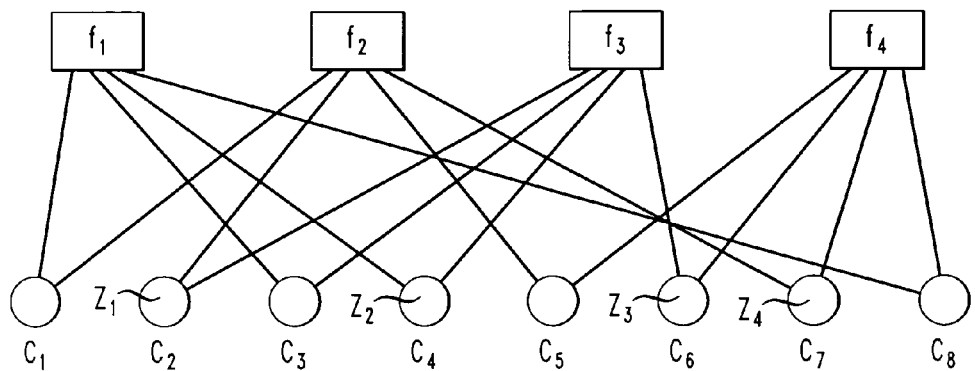
FIG. 1 is illustrative of LDPC codes.
Figure 2:
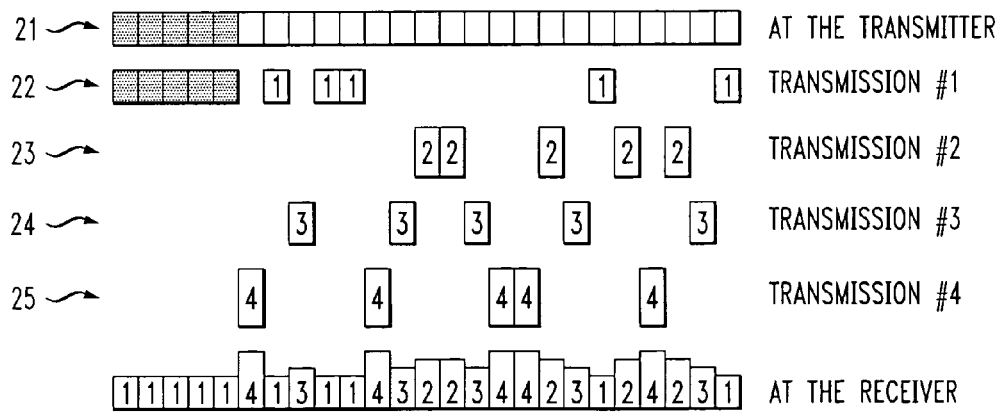
FIG. 2 is relates to the puncturing approach for transmitting LDPC codes.
Figure 3:
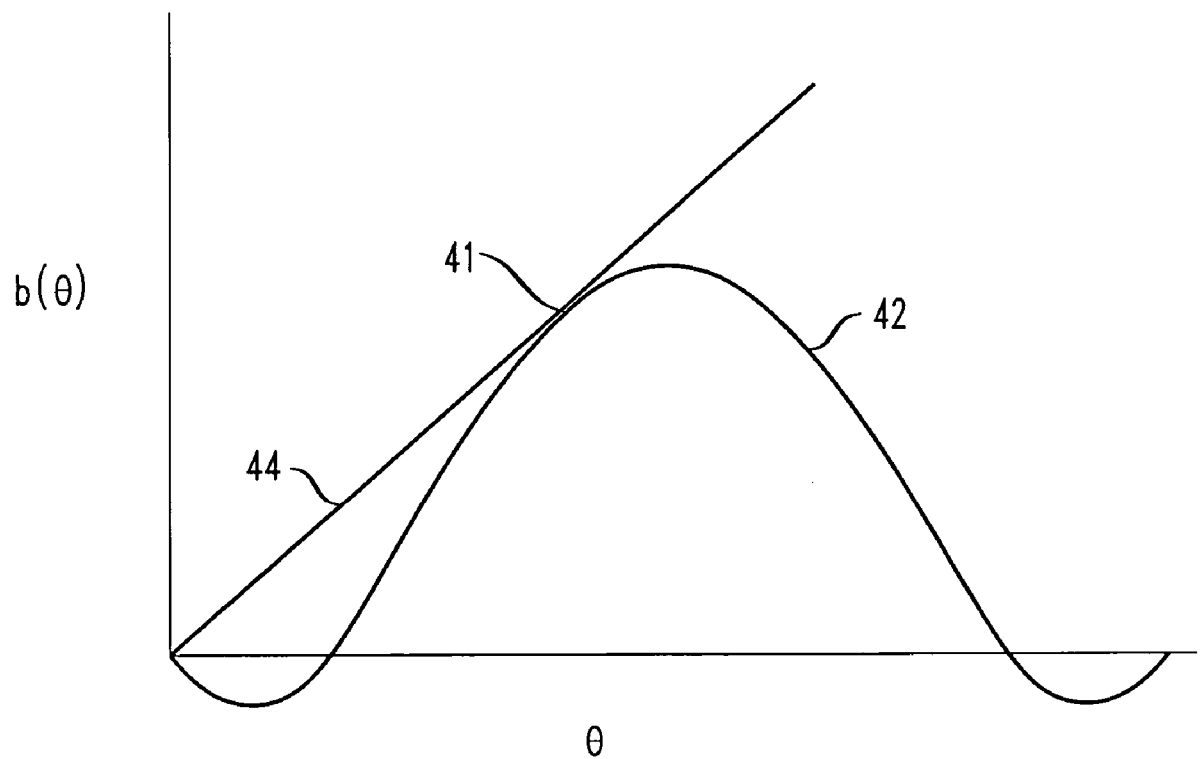
FIG. 3 demonstrates derivation of parameters useful for the invention.

In the calculations related to formula (2) and formula (3) the parameter $c_0$ is employed. (In the context of this invention, $c_0$ in denominated the ensemble spectrum parameter.) This parameter is derived from the code weight spectrum of the LDPC code employed in the puncturing process relative to formula (3) and the underlying LDPC or Turbo code for the Raptor code relative to formula (2). A typical ensemble spectrum is shown in FIG. 3 and is derivable from the equations given by Litsyn and Shevelev, IEEE Transactions on Information Theory, 48(4), 887 (2002) for regular LDPC codes and Litsyn and Shevelev, IEEE Transactions on Information Theory, 49(12), 3140-3159 (2003) for irregular LDPC codes. The $c_0$ is obtainable graphically by extending a line from the origin on a $\theta$ versus $b(\theta)$ graph to the point, 41, that forms a tangent to the weight spectrum curve, 42. $C_0$ is the slope of line 44. (A discussion of the calculation of $c_0$ in a context different from the subject invention is found in Hui Jin and McEliece, IEEE Transactions on Information Theory, 48(6), 1451-1461 (2002). The parameter θ is the fraction of 1's in the codeword and b(θ) is the ensemble spectrum as defined in Litsyn and Shevelev (2002) supra page 888 column 1 theorem 1.)

By use of the subject invention both punctured LDPC codes and Raptor codes are improved. Nevertheless, punctured LDPC codes generally become ineffective as channel noise increases. Through the use of the subject inventive Raptor code transmission acceptable operation is achievable even for transmission channels with excessive noise for adequate operation of a punctured LDPC code transmission. Thus a system is possible that uses punctured LDPC code at lower channel noise levels to gain the advantage of higher throughput. However, when noise levels increase so that this advantage is substantially diminished use of the inventive Raptor code transmission is advantageously implemented.

The following addendum is hereby made part of this specification and is included to provide details concerning the derivation of formulae used herein.

I. ADDENDUM

Throughout the addendum we suppose that the channel is a Binary Input Symmetric Channel (BISC). Input is taken from one of two discrete symbols and the channel is additive noise (discrete or continuous). Furthermore we assume that the channel is known only at the receiver and that the goal is to maximize the throughput. Consequently, we organize an IR-HARQ protocol as follows: Initially the transmitter sends only as many codeword symbols as necessary to ensure a high probability of successful ML decoding over a high SNR channel. If the decoding fails, the receiver sends a NACK and the channel information to the transmitter. Taking into account the channel information of the past transmission(s), the transmitter sends only as many additional codeword symbols as necessary to insure a high probability of successful ML decoding assuming a high SNR channel during the current transmission.

The ability of Raptor codes to produce, for a given set of k information symbols, as many codeword symbols as needed for their successful decoding is what makes these codes of interest for use in HARQ schemes. In this addendum, we first study the spectra of Raptor codes and the ML decoding error rates for HARQ schemes based on Raptor codes. As in the case of LDPC codes, we assume that the channel is known only at the receiver and the goal is to maximize the throughput. With that in mind, we organize an IR-HARQ scheme based on Raptor codes in a very similar fashion as in the HARQ scheme with LDPC codes. Taking into account the channel information of the past transmission(s), the transmitter generates and then sends only as many codeword symbols as necessary to insure a high probability of successful ML decoding assuming a high SNR channel during the current transmission. Consequently, the central question is to determine the minimum number of symbols which should be generated at each transmission and the minimum power at which they should be transmitted to ensure a low error rate. This question is answered in this paper.

In Section II we begin with a spectrum analysis of the LDPC code ensembles which we use in the HARQ schemes. In Section III we analyze ML decoding of LDPC codes for HARQ and describe an LR-HARQ protocol with random transmission assignments for this HARQ scheme. In this section we also provide results for belief-propagation (BP) decoding of the same codes. In Sections IV and V, we focus on Raptor codes—in Section IV we give an ML analysis and propose an IR-HARQ protocol and in Section Y we provide several results on BP decoding of Raptor codes for HARQ. In Section VI we give a comparison between HARQ schemes employing LDPC and Raptor codes.

II. THE SPECTRUM OF REGULAR LDPC CODE ENSEMBLES

We begin with several results regarding the spectrum of regular LDPC codes. The results given in this section are used as a foundation for both LDPC and Raptor code ensemble analysis.

We study ensembles of regular binary LDPC code whose k×n parity check matrices have r as the sum of each row and c as the sum of each column where $$0 < \zeta = \frac{c}{r} = \frac{k}{n} < 1.$$

The code rate of such codes is $R \geq 1-\zeta$.

Generally, for a binary linear code C we denote the weight enumerator by $A_h$ (i.e., the number of codewords of weight h in this code is $A_h$). For a code ensemble [C](n), the average number of codewords of normalized weight θ=h/n is denoted by $\overline{A}_\theta^{[C](n)}$. To analyze the performance of HARQ schemes based on LDPC codes, we are interested in the asymptotic behavior of left tail of the ensemble spectrum, namely $$\sum_{h=1}^{\lceil n\theta_0 \rceil} \overline{A}_h^{[C](n)},$$

where $0<\theta_0 \leq 1$, and in the quantity known as the ensemble noise threshold [3], which we here define as follows:

$$c_0^{[C]} = \limsup_{n \to \infty} \max_{\lceil n\theta_0 \rceil < h \leq n} \frac{\log \overline{A}_h^{[C](n)}}{h}.$$

We next show how these two quantities can be bounded. Our derivations are based on the results of Litsyn and Shevelev, IEEE Transactions on Information Theory, Vol. 48, 2002 and on certain results from the theory of large deviations. Only the main steps are presented here; details will be given in the Appendix to this addendum.

A. The Left Tail of the Ensemble Spectrum

We first derive upper bounds on the number of code words of small weight in the ensemble. Let p be the unique positive root of the following equation:

$$\frac{(1+\rho)^{r-1} + (1-\rho)^{r-1}}{(1+\rho)^r + (1-\rho)^r} = 1-\theta, \quad 0 < \theta < 1. \tag{1}$$

Note that rho→0 as θ→0. Then the following holds for sufficiently large n:

Theorem I: There is a constant C independent of θ and $n_0$ so that for $n > n_0$, $$\overline{A}_\theta^{[C](n)} \le C\left[\frac{(1+\rho)^r + (1-\rho)^r}{2\rho^{\theta r}}\right]^{n\zeta}[(1-\theta)^{(1-\theta)}\theta^\theta]^{n(\zeta r-1)}$$

Proof See Appendix I.

Note that for all sufficiently small θ and c ≧ 2, we can use the above upper bound to obtain $$\overline{A}_\theta^{[C](n)} \le C\left[\frac{\theta^{\zeta\theta r}}{\rho^{\zeta\theta r}\theta^\theta}\right]^n.$$

Using an estimate for p (see Appendix I) for sufficiently small θ, we find there is an ε>0 so that the RHS of the above inequality is upper-bounded by $$C[\theta^{(c/2-1)\cdot}((r-1)(1\times\epsilon))^{c/2}]^{n\theta}. \qquad (2)$$

Consequently, $$\overline{A}_\theta^{[C](n)} \le C[\theta^{(c/2-1)\cdot}((r-1)(1+\epsilon))^{c/2}]^{n\theta}$$

or, equivalently, $$\overline{A}_h^{[C](n)} \le C\left[\left(\frac{ha}{n}\right)^{c/2-1}\right]^h,$$

where $a = [(r-1)(1+\epsilon)]^{c/(c-2)}$.

We next investigate the left tail of the spectrum $$\sum_{h=1}^{\lceil n\theta_0\rceil} \overline{A}_h^{[C](n)} \le C\sum_{h=1}^{\lceil n\theta_0\rceil}\left[\left(\frac{ha}{n}\right)^{c/2-1}\right]^h,$$

and show that it converges to 0 as n→∞ for a suitable choice of ε₀. Note that we must choose c>3 and that we may show the result for c=3 only as the individual terms decrease monotonically as c is increased for a given (ha)/n. By considering x log x, we observe that the sequence $[(ha)/n]^h$ decreases as h increases provided (ha)/n<e⁻¹. Thus $$\sum_{h=1}^{\lceil n\theta_0\rceil}\left[\left(\frac{ha}{n}\right)^{c/2-1}\right]^h < (a/n)^{\frac{1}{2}} + (2a)/n + n\theta_0((3a)/n)^{3/2},$$

and consequently $$\sum_{h=1}^{\lceil n\theta_0\rceil} \overline{A}_h^{[C](n)} = O\left(n^{-\frac{1}{2}}\right).$$

B. The Ensemble Noise Threshold

The noise threshold $c_0^{[C](n)}$ for a fixed n is $$c_0^{[C](n)} = \max_{\lceil n\theta_0\rceil < h \le n} \frac{\log \overline{A}_h^{[c](n)}}{h}.$$

We can also equivalently write $$c_0^{[C](n)} = \sup_{\theta_0 < \theta \le 1} \frac{a_\theta}{\theta},$$

where $a_\theta \triangleq \log \overline{A}_\theta/n$.

Now, by applying the result of Thin. 1, we obtain $$\frac{a\theta}{\theta} \le \frac{(1-\tau\zeta)H(\theta)}{\theta} + \frac{\zeta}{\theta}\log\frac{\{(1+\rho)^r + (1-\rho)^T\}}{2\rho^{T\theta}}, \qquad (5)$$

where H(θ)=−(θ log θ+(1−θ) log(1−θ)) is the binary entropy function.

The RHS of (5) has a unique maximum in (0, ½). Therefore, we can obtain an upper bound on $c_0^{[C]}$ by differentiation with respect to θ of the RHS of (5). Recall that there is a dependency between ρ and θ expressed by (53). We can find the minimizing θ* numerically. For instance, in the case of r=5, c=3, we find that θ*=0.3189 and $c_0^{[C]} \le 0.6966$. We will come back to this bound later in Section III-D.

III. IR-HARQ SCHEMES BASED ON PUNCTURED LDPC CODES

Recall that we are mainly considering the scenario when the channel is known only at the receiver and the goal is to maximize the throughput. Therefore, in an IR-HARQ schemes based on LDPC codes, the idea is to, at each transmission, transmit only as many codeword symbols as necessary to insure a high probability of successful ML decoding on an ideal channel taking into account the information about the overhead and the channel state information during the past transmissions. We first analyze the ML performance of IR-HARQ schemes averaged over certain ensembles of LDPC codes and all possible transmission assignments (or puncturing patterns) of the mother code bits. We then test our results on HARQ schemes based on practical finite-length LDPC codes with rate compatible random puncturing.

A. The ML Decoding Analysis for LDPC Codes over Parallel Channels

We first consider a binary input memoryless channel with output alphabet Y and transition probabilities W(y|0) and W(y|1), y ∈ Y. When a codeword x ∈ C ⊆ {0, 1}$^n$ has been transmitted, the probability that the ML detector finds codeword x' at Hamming distance h from x more likely can be bounded as follows:

$$P_e(x, x') \le \gamma^h, \qquad (6)$$

where $\gamma$ is the Bhattacharyya noise parameter defined as $$\gamma = \sum_{y \in y} \sqrt{W(y|x=0)W(y|x=1)} \quad (7)$$

if Y is discrete and as $$\gamma = \int_y \sqrt{W(y|x=0)W(y|x=1)}\, dy$$

if Y is a measurable subset of R.

Generally, for an (n, k) binary linear code C with the weight enumerator $A_h$, we have the well known union-Bhattacharyya bound on the ML decoder word error probability $$P_W^C \leq \sum_{h=1}^{n} A_h \gamma^h.$$

Recall that, for a code ensemble [C](n), the average number of codewords of weight h in $c^{(n)}$ is denoted by $\overline{A}_h^{[C](n)}$. The bound on the ML decoder word error probability averaged over the ensemble is obtained by averaging the (additive) union bound:

$$\overline{P}_W^{[C](n)} \leq \sum_{h=1}^{n} \overline{A}_h^{[C](n)} \gamma^h.$$

Now, from the results of Section II, we know that there is $\theta 8^*$, such that $0 < \theta^* < 1$, and $$\sum_{h=1}^{\lceil n\theta^* \rceil} \overline{A}_h^{[C](n)} = O\left(n^{-\frac{1}{2}}\right)$$

and, for sufficiently large n, $$\overline{A}_h^{[C](n)} \leq_n \exp(hc_0^{[C]}), \{h\, n\theta^* < h \leq n\} \quad (9)$$

Therefore, for sufficiently large n, we have $$\begin{aligned}\overline{P}_W^{[C](n)} &\leq \sum_{h=1}^{n} \overline{A}_h^{[C](n)} \gamma^h \\ &\leq \sum_{h=1}^{\lceil n\theta^* \rceil} \overline{A}_h^{[C](n)} + \sum_{h=\lceil n\theta^* \rceil+1}^{n} \overline{A}_h^{[C](n)} \gamma^h \\ &\leq O\left(n^{-\frac{1}{2}}\right) + \sum_{h=\lceil n\theta^* \rceil+1}^{n} \exp[h(c_0^{[C]} + \log \gamma)].\end{aligned} \quad (10)$$

Thereby, when $$\gamma < \exp(-c_0^{[C]}), \quad (11)$$

we have $$\overline{P}_W^{[C](n)} \leq O\left(n^{-\frac{1}{2}}\right).$$

We now assume that the channel varies during the transmission of a single codeword, namely, channel transition probabilities at time i are $W_i(b|0)$ and $W_i(b|1)$, $b \in Y$. When codeword $x \in \{0, 1\}^n$ has been transmitted, the probability that the ML detector finds codeword $x' \in \{0, 1\}^n$ more likely can be bounded as follows:

$$P_e(x, x') \leq \sum_{y \in y^n} \sqrt{W^n(y|x)W^n(y|x')},$$

where we denote $$W^n(y|x) = \prod_{i=1}^{n} W_i(y_i|x_i).$$

It is easy to see that $$\begin{aligned}P_e(x, x') &= \sum_{y \in y^n} \sqrt{W^n(y|x)W^n(y|x')} \\ &= \prod_{i=1}^{n} \left(\sum_{b \in y} \sqrt{W_i(b|x_i)W_i(b|x_i')}\right).\end{aligned} \quad (12)$$

Note that when $x_i = x'_i$, the corresponding factor $\sum_{b \in Y} \sqrt{W_i(b|x_i)W_i(b|x'_i)}$ in the product (12) equals 1 and can be omitted. When $x_i \neq x'_i$, the corresponding factor $\sum_{b \in Y} \sqrt{W_i(b|x_i)W_i(b|x'_i)}$ equals to the Bhattacharyya noise parameter $\gamma_i$ of the channel at time i:

$$\gamma i = \sum_{b \in y} \sqrt{W_i(b|0)W_i(b|1)}$$

Therefore, the bound (12) can be written as $$P_e(x, x') \leq \prod_{i: x_i \neq x'_i} \gamma_i. \quad (13)$$

Note that when all $\gamma_i$ have the same value $\gamma$ (time-invariant channel case), the above bound reduces to the well known $\gamma^h$ bound (6), where h is the Hamming distance between x and x'.

We now assume that the codewords of the mother code are transmitted in m transmissions, and the decoding is performed after the last transmission has been received. This will help us to later analyze an IR-HARQ protocol with at most m transmissions. Let $I = \{1, \ldots, n\}$ denote the set indexing the bit positions in a codeword. For the m transmissions, set I is partitioned in m subsets I(j), for $1 \leq j \leq m$. During the j-th transmission, only bits at positions i where $i \in I(j)$ are transmitted. We assume that the channel is slowly time-varying, namely that $W_i(y|0)$ and $W_i(y|1)$ remain constant for all bits at positions i taking part in the same transmission. Consequently, the Bhattacharyya noise parameter for transmission j depends only on j:

$$\gamma_i \gamma(j) \text{ for all } i \in I(j).$$

Let $h_j = d_H(x, x', I(j))$ denote the Hamming distance between sequences x and x' over the index set I(j). The bound (13) can be written as $$P_e(x, x') \leq \prod_{j=1}^{m} \gamma(j)^{h_j}, \quad h_j = d_H(x, x', I(j)).$$

In the case of only two transmissions, we have $$P_e(x, x') \leq \gamma(1)^{d_H(x, x', I(1))} \times \gamma(2)^{d_H(x, x', I(2))} = \gamma(1)^{h_1} \gamma(2)^{h-h_1},$$

where h is the Hamming distance between x and x'.

Let $A_{h_1 \ldots h_m}$ denote the number of codewords with weight $h_j$ over the index set I(j), for $1 \leq j \leq m$. The union bound on the ML decoder word error probability is given by $$P_w \leq \sum_{h_1=1}^{|I(1)|} \cdots \sum_{h_m=1}^{|I(m)|} A_{h_1 \ldots h_m} \prod_{j=1}^{m} \gamma(j)^{h_j}. \quad (14)$$

Further direct analysis of this expression seems formidable, even in the case of only two transmissions for which we have $$P_w \leq \sum_{h_1=1}^{|I(1)|} \sum_{h_2=1}^{|I(2)|} A_{h_1 h_2} \gamma(1)^{h_1} \gamma(2)^{h_2}$$
$$= \sum_{h=1}^{n} \sum_{h_1=1}^{|I(1)|} A_{h_1, h-h_1} \gamma(1)^{h_1} \gamma(2)^{h-h_2}.$$

We thus resort to finding the expected performance over all possible transmission assignments where a bit of a mother code is assigned to transmission j with probability $\alpha_j$, $\alpha_j > 0$, $\Sigma_j \alpha_j = 1$. The expected (and asymptotic as $n \to \infty$) number of bits assigned to transmission j equals to $\alpha_j n$. Such scheme can actually be implemented as follows:

1) For each bit position i, i = 1, 2, ..., n, generate a number $\theta_i$ independently and uniformly at random over [0, 1).
2) Compute m numbers $\lambda_j$ as follows:

$$\lambda_j = 1 - \sum_{i=1}^{j} \alpha_i \text{ for } 1 \leq j \leq m.$$

Note that $0 = \lambda_m < \lambda_{m-1} < \ldots < \lambda_2 < \lambda_1 < 1$.

3) Make the transmission assignment for each bit i, i = 1, 2, ..., n, as follows:
   a) if $\theta_i \geq \lambda_1$, assign bit i to transmission 1, otherwise
   b) if $\lambda_j \leq \theta_i < \lambda_{j-1}$, for some j s.t. $2 \leq j \leq m$, assign bit i transmission j.

We are interested in the expected performance of the mother code under this probabilistic model. If each bit of a codeword with Hamming weight h is randomly assigned to transmission j with probability $\alpha_j$, then the probability that the sub-word corresponding to the j-th transmission has weight $h_j$ for $1 \leq j \leq m$ is given by $$\binom{h}{h_1}\binom{h-h_1}{h_2}\cdots\binom{h-h_1-\ldots-h_{m-1}}{h_m}\alpha_1^{h_1}\alpha_2^{h_2}\ldots\alpha_m^{h_m}. \quad (15)$$

Therefore, for a given codeword with Hamming weight h, the expected value of $A_{h_1, \ldots, h_m}$ is given by $$\bar{A}_{h_1, \ldots, h_m} = A_h \binom{h}{h_1}\binom{h-h_1}{h_2}\cdots\binom{h-h_1-\ldots-h_{m-1}}{h_m}\alpha_1^{h_1}\alpha_2^{h_2}\ldots\alpha_m^{h_m},$$

and consequently, the expected value of the union bound (14) is $$\bar{P}_w \leq \sum_{h_i \geq 0; \Sigma h_i \leq n} \bar{A}_{h_1, \ldots, h_m} \gamma(1)^{h_1} \gamma(2)^{h_2} \ldots \gamma(m)^{h_m}$$
$$= \sum_h A_h \left\{ \sum_{\Sigma h_i = h} \binom{h}{h_1}\binom{h-h_1}{h_2}\cdots\binom{h-h_1-\ldots-h_{m-1}}{h_m} \prod_{j=1}^{m}(\gamma(j)\alpha_j)^{h_j} \right\}$$
$$= \sum_h A_h \left( \sum_{j=1}^{m} \gamma(j)\alpha_j \right)^h.$$

We define the average Bhattacharyya noise parameter seen by the mother code as $$\bar{\gamma} = \sum_{j=1}^{m} \gamma(j)\alpha_j. \quad (16)$$

Then, we have $$\bar{P}_W^{[C]} \leq \sum_{h=1}^{n} \bar{A}_h^{[C](n)} \bar{\gamma}^h. \quad (17)$$

Therefore, when $$\bar{\gamma} < \exp(-c_0^{[C]}), \quad (18)$$

we have $$\bar{P}_W^{[C](n)} \leq O(n^{-1/2}).$$

B. An IR-HARQ Protocol

We consider an IR-HARQ scheme with at most m transmissions where a bit is assigned to transmission j with probability $\alpha_j$. Transmission j takes place if transmission j−1 fails.

The rates $\alpha_j$ may be predetermined (e.g., specified by a standard) or determined based on current network conditions. In both cases, we are interested in evaluating performance after j transmissions, $1 \leq j \leq m$. In the latter case, we are interested in determining the parameters $\alpha_j$ to achieve some required performance.

To ensure that the upper bound (8) on the probability of error of the ML decoder approaches 0 on a channel with the Bhattacharyya noise parameter $\gamma$, as $n \to \infty$, it is sufficient and necessary that the condition (11) holds. Therefore, in HARQ schemes, the mother code is chosen so that this condition is satisfied for the worst probable channel realization.

We now assume that the decoding after transmission j−1 failed. On the average, $n\alpha_j$ bits will participate in the j-th transmission, and the remaining $(1-\alpha_1-\ldots-\alpha_j) \times n$ bits of the mother code will not be transmitted. We assume that they are transmitted over a really bad channel, i.e., a channel with $\gamma(j+1)=1$, and compute $\bar{\gamma}(j)$, the average Bhattacharyya noise parameter after the j-th transmission, as $$\bar{\gamma}(j) = \alpha_1 \times \gamma(1) + \ldots + \alpha_j \times \gamma(j) + (1-\alpha_1-\ldots-\alpha_j) \times 1.$$

Our goal is to guarantee $\lim_{n\to\infty} P_W^{[C](n)} \to 0$, and this can be done by choosing $\alpha_j$ or $\gamma(j)$ or both so that $$\bar{\gamma}(j) < \exp(-c_0^{[C]}). \quad (19)$$

Condition (19) can be written in a form which clearly shows the tradeoff between the rate of the j-th transmission code and the signal power:

$$\alpha_j(1-\gamma(j)) > 1 - \exp(-c_0^{[C]}) - \sum_{i=1}^{j-1} \alpha(i)(1-\gamma(i)). \quad (20)$$

To satisfy the above lower bound on the product of $\alpha_j$ and $1-\gamma(j)$, the transmitter can either increase the code redundancy $\alpha_j$ or increase the signal power which results in a decrease of $\gamma(j)$ and increase of $1-\gamma(j)$. An increase in redundancy results in the lower throughput of the user while an increase in the power results in a higher interference level experienced by other users in the network. Since $\gamma(j)$ is positive, there is a minimum redundancy requirement:

$$\alpha_j > 1 - \exp(-c_0^{[C]}) - \sum_{i=1}^{j-1} \alpha(i)(1-\gamma(i)). \quad (21)$$

Note that this condition ensures that the probability of error of the ML decoding is bounded by $O(n^{1/2})$ for high SNR. In the case of predetermined $\alpha_j$ (as it is sometimes in practice), the required signal power is specified by $$\gamma(j) < \frac{\exp(-c_0^{[C]}) - (1-\alpha_j) + \sum_{i=1}^{j-1} \alpha(i)(1-\gamma(i))}{\alpha_j}. \quad (22)$$

In this protocol, equations (20), (21), and (22) constitute j-th transmission rules after transmission j−1 fails.

C. Upper Bounds on Throughput for BP Decoding of LDPC Codes in High SNR Region

We now turn to belief-propagation (BP) decoding. We first examine the maximum throughputs that can be supported by randomly punctured LDPC codes ensembles decoded using BP To do so, we study the code performance over an ideal channel i.e., very high SNR channel. The following results are described in a variety of papers. In random puncturing, the bits which have not been transmitted can be considered as erasures. For ensembles of very long LDPC codes, successful decoding is obtained provided the rate of erasures is below the iterative decoding threshold p. This latter quantity is defined for single parameter families of channels with parameter $\theta$ as follows.

Definition 1: Let $P_e^\infty(l)$ be the expected fraction of incorrect messages passed in iteration l under the condition that the graph does not contain any cycles of length 2l or less. Then the iterative decoding threshold is defined to be $$\theta^* := \lim_{\theta_0} \sup\{\theta_0 > 0 : P_e^\infty(l) \to 0, l \to \infty, \forall \theta < \theta_0\}$$

$\theta^*$ can be determined as the largest $p \in [0, 1]$ for which $$x = p\lambda(1-\rho(-x)) \quad (23)$$

has no other root than 0 for $x \in [0, p]$. Here $\lambda(x) = \Sigma_i \lambda_i x^{i-1}$, $\rho(x) = \Sigma_j \rho_j x^{j-1}$ are the generator polynomials for the degree distributions of the variable and check nodes respectively. That is, $\lambda_i$ denotes the fraction of edges connected to symbol nodes of degree i and $\rho_j$ denotes the fraction of edges connected to check nodes of degree j.

For example consider a regular (3, 5) LDPC code so that the variable and check node edge distribution polyno-mials are $\lambda(x)+x^2$, $\rho(x)+x^4$. The rate of this code is $R_{(3,5)}=0.4$. By optimizing for $x \in (0, 1]$ we find that the largest p for which $$x = p(1-(1-x)^4)^2 \quad (24)$$

has no root other than 0 is $P_{(3,5)}=0.5175702$ which is the iterative decoding threshold in this case. It follows that a punctured version of this code ensemble can attain a maximum throughput of $T_{(3,5)}=0.4/(1.0-0.5175702)=0.82914$ over an ideal channel. For regular (3, 15) and (3, 30) codes we similarly find that $T_{(3,15)}=0.8/(1.0-0.167518)=0.96098$ and $T_{(3,30)}=0.9/(1.0-0.082835) =0.98128472$. Thus we may expect high rate LDPC mother codes to provide high throughputs when the channel SNR is high, but we see that very high throughputs are not achievable when the LDPC mother code rate is low. This agrees with the results presented in Li and Naryanan, Int. Conf. on Comms., Internet and Information Technology (CuT) November 2002 and is confirmed with our simulation results presented next.

D. LDPC Code Examples

Figure 6:
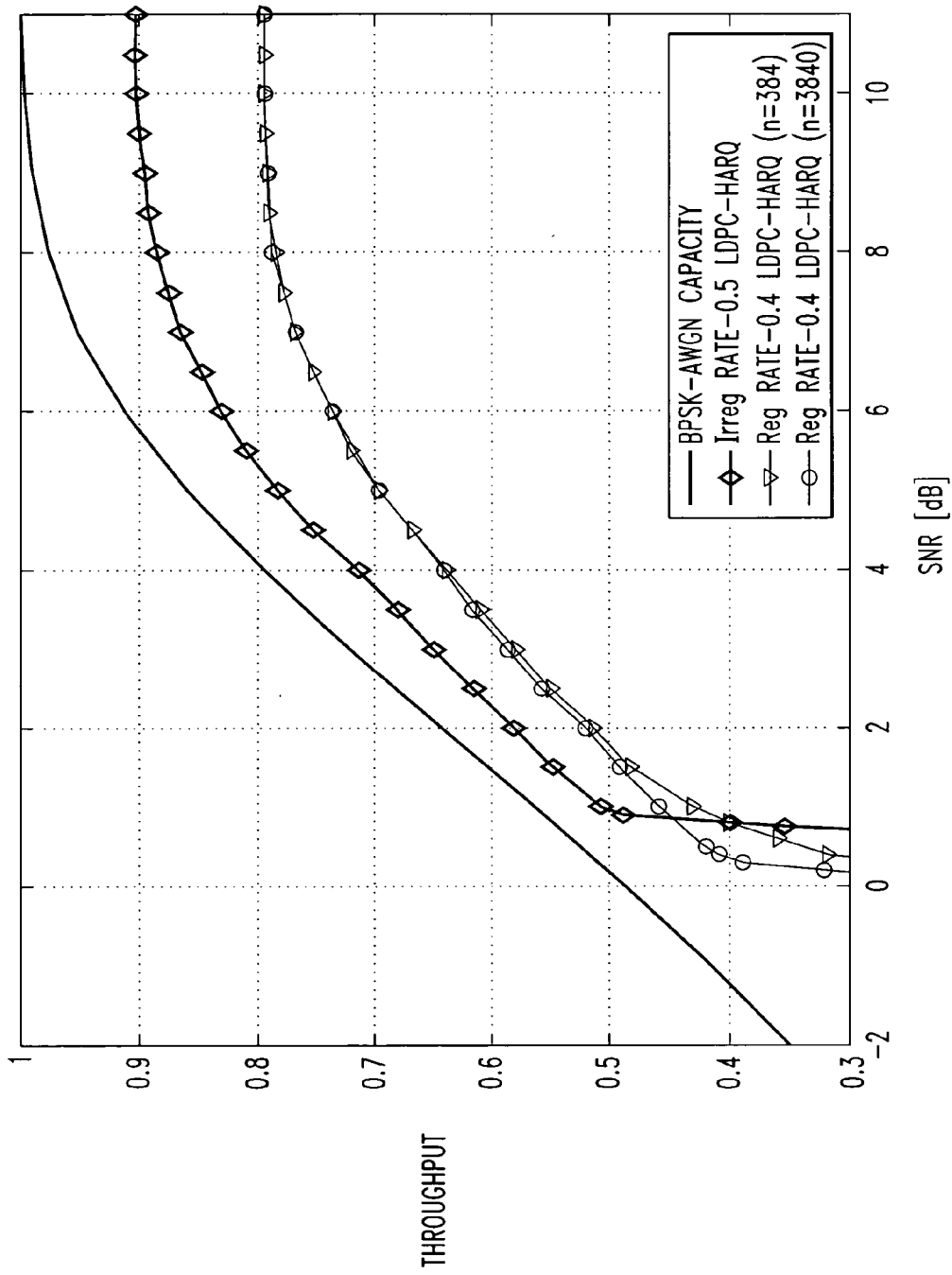
FIG. 6 displays calculated results.
Figure 7:
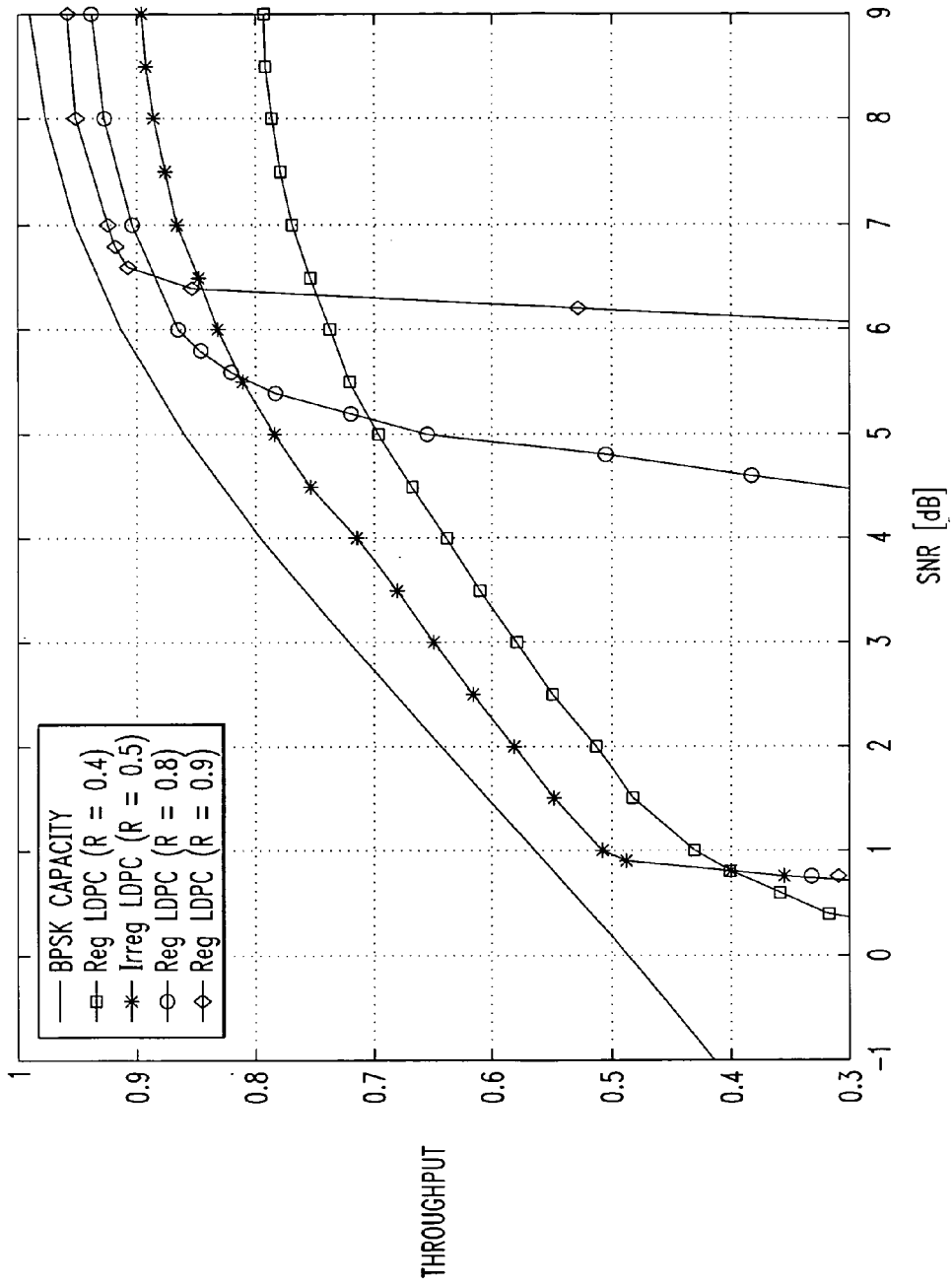
FIGS. 7-11 are illustrative of parameters involved in the invention.

We consider the IR-HARQ schemes on an additive white Gaussian noise channel (AWGN) with Binary Phase Shift Keying signalling. In FIGS. 6 and 7 we plot the average throughput for a range of SNRs. (SNR is defined as SNR=$10 \log_{10} \sigma^{1/2}$, where $\sigma$ is the noise standard deviation.) The puncturing rates were chosen to be $$R_p=1, 0.975, 0.95, 0.925, \ldots, R. \quad (25)$$

In other words, after sending the first k=Rn bits, in the subsequent transmission (if it is necessary, i.e., if a codeword is not achieved after 50 decoding iterations) we send additional (1−0.975)n randomly selected parity bits, and decoding is attempted again. This procedure is repeated until an acknowledgement (ACK) is received or until all n symbols are sent.

First, in FIG. 6, we evaluate the performance of the punctured regular-(3,5) codes with block lengths n=384 and n =3840. (These block lengths are typically specified by wireless standards.) The code rates of these mother codes are R=ξ=0.4. Then, in FIG. 7 we plot the performance of two punctured codes with higher mother code rates. (For comparison we also include the plots from FIG. 6 in FIG. 7.) The parity check matrices of all mother codes were chosen randomly from the (expurgated) ensembles consisting of the codes satisfying the column-sum and the row-sum constraints (e.g., c=3 and r=5 for regular-(3,5) codes) and the additional constraint that the girth of the corresponding code graphs is at least 6.

For comparison, in FIGS. 6 and 7 we also plot the Binary Phase Shift Keying capacity of the AWGN channel and the performance of one optimized irregular LDPC code with the code rate R=0.5. The irregular mother code was designed based on the optimized edge degree polynomials given by $\lambda(x)=\Sigma_i\lambda_i x^{i-1}$=0.21991x+0.23328$x^2$+0.02058$x^3$+0.08543$x^5$ +0.06540$x^6$+0.04767$x^7$+0.01912$x^8$+0.08064$x^{18}$+ 0.22798$x^{19}$ and $\rho(x)=\Sigma_i\rho_i x^{i-1}$=0.64854$x^7$+0.34747$x^8$+ 0.00399$x^9$. Its block length was set to n=10000. From FIG. 6, we observe that the two regular-(3,5) codes with different block lengths have almost identical performance except in the close neighborhood of the point for which the throughput equals the mother code rate R=0.4. Naturally, the performance of the optimized irregular mother code is better than the performances of the regular mother codes. This performance is within 1dB of the capacity for the range of throughputs 0.5–0.75. As the throughput is further increased above 0.8 (i.e., as the average puncturing rate further increases) the performance of the irregular code quickly deteriorates. This performance curve saturates roughly at the rate 0.9. Very similar behavior is observed for the regular codes shown in FIGS. 6 and 7. Note that the saturation of the regular-(3,5) code performance curves happens at the rate 0.8. We next demonstrate on this code example how to use the results of Section H to estimate the point at which the code "breaks down".

An upper bound to the noise threshold $c_0^{[c]}$ for the regular-(3,5) ensemble was computed in Section II to be 0.6966. Since the minimal redundancy requirement for the first transmission is $\alpha_1 > 1$ exp($c_0^{[c]}$), we can compute a conservative estimate of this quantity based on the upper bound on $c_0^{[c]}$. We obtain $\alpha_1$=0.514 and the corresponding rate $r_p=r/\alpha_1 < 0.7973$. Although this result gives only the necessary condition on the minimal $\alpha_1$, our simulations show that it predicts the saturation point very well. Indeed, looking at FIG. 6, we see that the performance curve saturates at exactly this rate.

Another way to estimate the saturation point is to use directly the results of Section III-C. Recall that the upper bound on the throughput for regular-(3,5) code was evaluated to be $T_{(3,5)}$=0.82914. Naturally, this bound is not tight for the finite-length codes presented in FIG. 6 as the bound is achievable only with very long codes when a sufficiently large number of decoding iterations is allowed.

Figure 8:
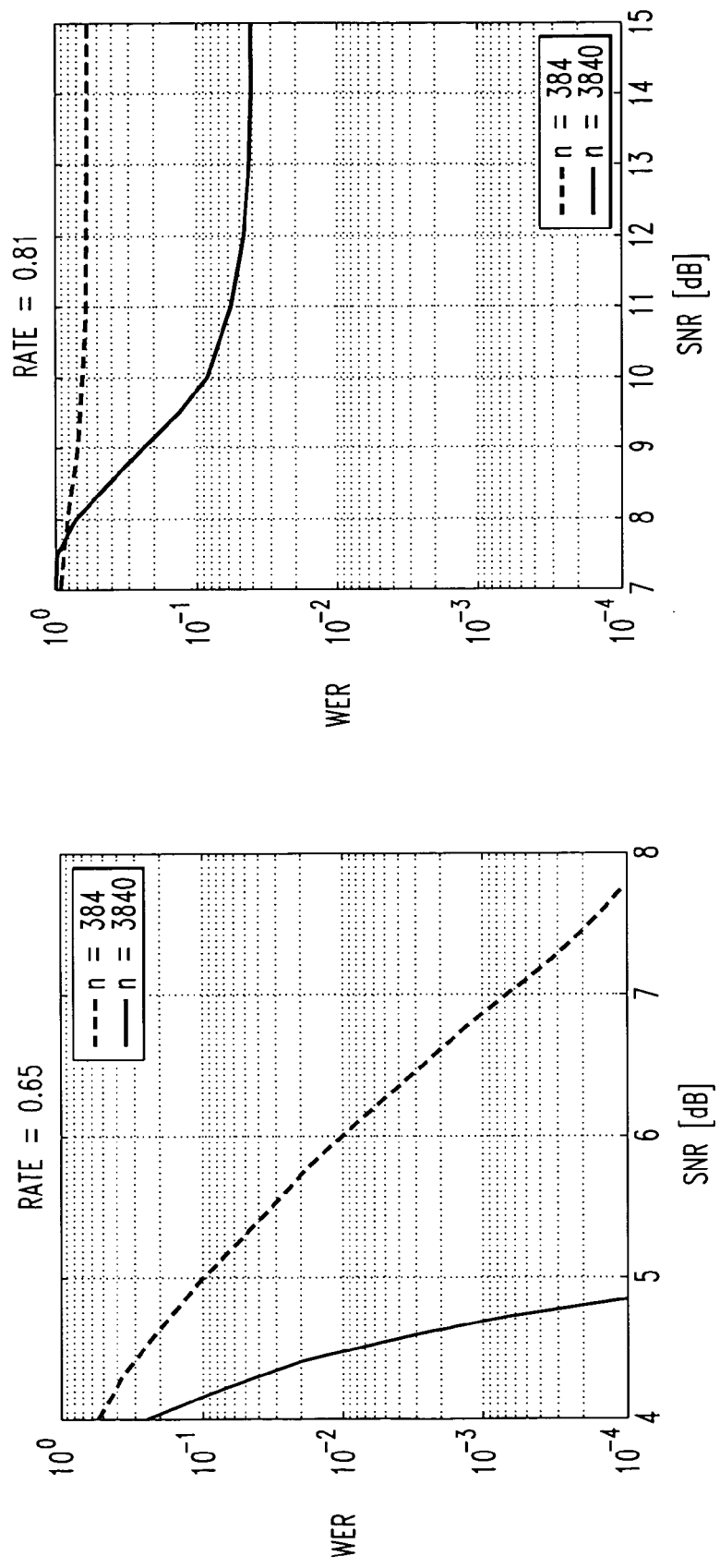

In FIG. 8, we demonstrate the word error rate (WER) performance of the two regular mother codes studied in FIG. 6. We compare the performances of the punctured codes with rates equaling 0.65 and 0.81. (These codes were obtained from the two regular mother codes after random puncturing.) It is not surprising that the slope of the word error rate curve in the "waterfall region" decreases as the block length is decreased from n=3840 to n=384. It is, however, interesting that from these plots we can clearly observe that puncturing is not effective when the puncturing rates are very high. That is, for the rate 0.81 the performance of both codes is very poor and even at high SNRs the WERs below 0.04 can not be achieved. Finally, we observe from FIG. 7 that one solution that allows higher throughputs is to use higher rate mother LDPC codes. They, however, have a quite narrow operation region of SNRs in which they are very effective, see FIG. 7. In some applications, it would be more useful to have codes that are effective at a wide operating range of SNRs. We next analyze IR-HARQ schemes based on Raptor codes and show that they indeed have this property.

IV. HARQ SCHEMES BASED ON RAPTOR CODES

Recall that to obtain a Raptor codeword, the information sequence of k symbols is pre-coded by a high rate block code. Here LDPC codes will be used for pre-coding. The Raptor codeword symbols are then obtained based on the n resulting symbols by the means of a probability distribution Ω on the numbers 1,..., n. The probability generating function of this distribution is $$\Omega(x) = \sum_{d=1}^{n} \Omega_d x^d. \quad (26)$$

Each codeword symbol is obtained independently, by first sampling this distribution to obtain a number d, and then adding the values of d randomly chosen information symbols. Note that Ω represents the degree distribution of the codeword symbols, and thus can be used to determine the degree distribution of the corresponding bipartite variable/check graph used for BP decoding. In an IR-HARQ schemes based on Raptor codes, the idea is to, at each transmission, generate and then transmit only as many codeword symbols as necessary to insure a high probability of successful ML decoding on an ideal channel taking into account the information about the overhead and the channel state information during the past transmissions. Thus, we first analyze the ML performance of HARQ schemes based on Raptor codes.

A. The ML Decoding Analysis for Raptor Codes over Parallel Channels

When a codeword x of length-N Raptor code has been transmitted over the channel with the Bhattacharyya noise parameter γ, the probability that the ML detector finds codeword x' at Hamming distance w from x more likely can be bounded as $$P_e(x,x') \leq \gamma^w.$$

If an (n, k) binary LDPC code ensemble [C](n) with the weight enumerator $A_h$ is used as the precode in the Raptor scheme with the degree distribution Ω, then the number of Raptor codewords of weight w is given by $$\sum_{h=1}^{n} \overline{A}_h^{[C](n)} \binom{N}{w} p(h/n)^w (1 - p(h/n))^{N-w},$$

where p(h/n) denotes the probability of 1 in the Raptor codeword when the input LDPC codeword has normalized weight h. It is easy to see the following:

$$p(\beta) = \sum_d \Omega_d \sum_{j=1, j\,odd}^d \binom{d}{j} \beta^j (1-\beta)^{d-j}$$

$$= \frac{1}{2} \sum_d \Omega_d [\beta + (1-\beta)]^d - \frac{1}{2} \sum_d \Omega_d [-\beta + (1-\beta)]^d$$

$$= \frac{1}{2} - \frac{1}{2} \sum_d \Omega_d (1-2\beta)^d$$

and $$1 - p(\beta) = \frac{1}{2} + \frac{1}{2} \sum_d \Omega_d (1-2\beta)^d.$$

The Union-Bhattacharyya bound on the ML decoder word error probability for Raptor code ensembles can therefore be expressed as $$\overline{P}_W^{[C](n)} \leq \sum_{w=1}^N \sum_{h=1}^n \overline{A}_h^{[C](n)} \binom{N}{w} p(h/n)^d (1-p(h/n))^{N-w} \gamma^w$$

$$= \sum_{h=1}^n \overline{A}_h^{[C](n)} \sum_{w=1}^N \binom{N}{w} p(h/n)^d (1-p(h/n))^{n-d} \gamma^w$$

$$= \sum_{h=1}^n \exp(n\theta a_\theta)[1 - p(\theta)(1-\gamma)]^N.$$

Note that $\gamma < p(h/n) \cdot \gamma + 1 - p(h/n) < 1$. Therefore, the above expression can be bounded in a manner of (10), as follows $$\overline{P}_W^{[C](n)} \leq \sum_{h=1}^n \overline{A}_h^{[C](n)} \gamma^h \quad (28)$$

$$\leq \sum_{h=1}^{\lceil n\theta^* \rceil} \overline{A}_h^{[C](n)} + \sum_{h=\lceil n\theta^* \rceil+1}^n \overline{A}_h^{[C](n)} [p(h/n) \cdot \gamma + 1 - p(h/n)]^N$$

$$\leq O\left(n^{-\frac{1}{2}}\right) + \sum_{h=\lceil n\theta^* \rceil+1}^n \overline{A}_h^{[C](n)} [p(h/n) \cdot \gamma + 1 - p(h/n)]^N$$

$$= O\left(n^{-\frac{1}{2}}\right) + \sum_{\theta \in T, \theta > \theta^*} \exp(n\theta a_\theta) \cdot [1 - p(\theta)(1-\gamma)]^N, \quad (29)$$

where a is the spectrum of the LDPC code as defined by equation (4) and $T = \{1/n, \ldots, n-1/n, 1\}$. It is interesting to compare the expression (28) with the corresponding expression (10) for the LDPC codes without the LT coding, which can be obtained from (28) merely by substituting $\gamma^h$ in the place of $[p(h/n) \cdot \gamma + 1 - p(h/n)]^N$. Since $\gamma < [p(h/n) \cdot \gamma + 1 - p(h/n)]$, the LT code has the effect of making the channel noisier according to the original weight of the LDPC codeword.

In the time-varying case, when a codeword x of length-$(N_1+N_2)$ Raptor code has been transmitted over the channel with the Bhattacharyya noise parameter $\gamma_1$ during the first $N_1$ symbol intervals and the channel with the Bhattacharyya noise parameter $\gamma_2$ during the following N2 symbol intervals, the probability that the ML detector finds codeword x' at Hamming distance $w_1$ from x over the first $N_1$ bits and Hamming distance $w_2$ from x over the second $N_2$ bits more likely can be bounded as $$P_e(x,x') \leq \gamma_1^{w_1} \gamma_2^{w_2}.$$

If an (n, k) binary LDPC code C with the weight enumerator Ah is used as the precode in the raptor scheme with the degree distribution $\Omega$, then the number of Raptor codewords of weight w is given by $$B_{w1w2} = \sum_{h=1}^n A_h \binom{N_1}{w_1} p(h/n)^{w_1} (1 - p(h/n))^{N_1 - w_1} \binom{N_2}{w_2}$$

$$p(h/n)^{w_1} (1 - p(h/n))^{N_2 - w_2},$$

where p(h/n) denotes the probability of 1 in the Raptor codeword when the input LDPC codeword has normalized weight h. The Union-Bhattacharyya bound on the ML decoder word error probability for Raptor codes can therefore be expressed as $$\overline{P}_W^{[C](n)} \leq B_{w_1 w_2} \gamma_1^{w_1} \gamma_2^{w_2} =$$

$$\sum_{\theta \in T} \exp(n\theta a_\theta)[1 - p(\theta)(1 - \gamma 1)]^{N_1} [1 - p(\theta)(1 - \gamma 2)]^{N_2}$$

Similarly, when a codeword a, of length($N_1 + N_2 + + N_m$) Raptor code has been transmitted over the channel with the Bhattacharyya noise parameter $\gamma_1$ during the first $N_1$ symbol intervals, the channel with the Bhattacharyya noise parameter $\gamma_2$ during the following $N_2$ symbol intervals, and so on, the channel with the Bhattacharyya noise parameter $\gamma_m$ during the last $N_m$ symbol intervals, then the ML decoder word error probability can be bounded as $$\overline{P}_W^{[C](n)} \leq \sum_{\theta \in T} \exp(n\theta a_\theta)[1 - p(\theta)(1-\gamma_1)]^{N_1} [1 - p(\theta)(1-\gamma_2)]^{N_2} \ldots [1 - p(\theta)(1-\gamma_m)]^{N_m} \quad (30)$$

B. An IR-HARQ Protocol

In Section IV-A, we derived the following bound (see (29)):

$$\overline{P}_W^{[C](n)} \leq O\left(n^{-\frac{1}{2}}\right) + \sum_{\theta \in T, \theta > \theta^*} \exp(n\theta a_\theta) \cdot [1 - p(\theta)(1-\gamma)]^N,$$

We will use the inequality $(1-x) \leq e^{-x}$ to bound $[1-p(\theta)(1-\gamma)]^N$ which is tight in the law SNR region ($\gamma$ close to 1). Taking into account the definition of the noise threshold (3), we obtain $$\overline{P}_W^{[C](n)} \leq O\left(n^{-\frac{1}{2}}\right) + \sum_{\theta \in T, \theta > \theta^*} \exp(n\theta a_\theta) \cdot [1 - p(\theta)(1-\gamma)]^N$$

$$\leq O\left(n^{-\frac{1}{2}}\right) + \sum_{\theta \in T, \theta > \theta^*} \exp(na_\theta) \cdot \exp[-Np(\theta)(1-\gamma)]$$

$$\leq O\left(n^{-\frac{1}{2}}\right) + \sum_{\theta \in T, \theta > \theta^*} \exp\left[n\theta\left(c_0 - \frac{p(\theta)}{\theta}(1-\gamma)\frac{1}{R_l}\right)\right]$$

Therefore, when the rate of the Raptor code satisfies $$R_l < \frac{(1-\gamma)}{c_0} \cdot \pi_\Omega,$$

where $$\pi_\Omega \doteq \min_\theta \frac{p(\theta)}{\theta}$$

we have $$\overline{P}_W^{[C](n)} \leq O\left(n^{-\frac{1}{2}}\right).$$

By using the same bounding techniques in the time-varying case (see (30)), when a codeword x of length—$(N_1 + N_2 + \ldots + N_m)$ Raptor code has been transmitted over the channel with the Bhattacharyya noise parameter $\gamma_1$ during the first $N_1$ symbol intervals, the channel with the Bhattacharyya noise parameter $\gamma$ during the following $N_2$ symbol intervals, and so on, the channel with the Bhattacharyya noise parameter $\gamma_m$ during the last $N_m$ symbol intervals, we obtain the following result:

$$\overline{P}_W^{[C](n)} \leq O\left(n^{-\frac{1}{2}}\right) + \exp\left\{n\theta\left[c_0 - \frac{p(\theta)}{\theta}\left(\frac{1-\gamma 1}{R_{l1}} + \frac{1-\gamma 2}{R_{l2}} + \ldots + \frac{1-\gamma m}{R_{lm}}\right)\right]\right\},$$

where $R_{lj} = n/N_j$. Therefore, when $$\frac{c_0}{\pi_\Omega} < \frac{1-\gamma 1}{R_{l1}} + \frac{1-\gamma 2}{R_{l2}} + \ldots + \frac{1-\gamma m}{R_{lm}}, \quad (31)$$

we have $$\overline{P}_W^{[C](n)} \leq O\left(n^{-\frac{1}{2}}\right).$$

Condition (31) can be written in a form which clearly shows the tradeoff between the rate of the j-th transmission code and the signal power:

$$R_{lj}^{-1}(1-\gamma(j)) > \frac{c_0}{\pi_\Omega} - \sum_{i=1}^{j-1} R_{li}^{-1}(1-\gamma(i)). \quad (32)$$

To satisfy the above lower bound on the product of $R_{lj}^{-1}$ and $1-\gamma(j)$, the transmitter can either increase the code redundancy $R_{lj}^{-1}$ or increase the signal power which results in a decrease of $\gamma(j)$ and increase of $1-\gamma(j)$. An increase in redundancy results in the lower throughput of the user while an increase in the power results in a higher interference level experienced by other users in the network. Since $\gamma(j)$ is positive, there is a minimum redundancy requirement:

$$R_{lj}^{-1} > \frac{c_0}{\pi_\Omega} - \sum_{i=1}^{j-1} R_{li}^{-1}(1-\gamma(i)). \quad (33)$$

Note that this condition ensures that the probability of error of the ML decoding is bounded by $O(n^{1/2})$ for high SNR. In the case of predetermined $a\alpha_j$ (as it is sometimes in the practice), the required signal power is specified by $$\gamma(j) < \frac{-\frac{c_0}{\pi_\Omega} + R_{lj}^{-1} + \sum_{i=1}^{j-1} R_{li}^{-1}(1-\gamma(i))}{R_{lj}^{-1}}. \quad (34)$$

Equations (32), (33), and (34) constitute j-th transmission rules after transmission j−1 fails. It is interesting to compare them with their counterparts for LDPC codes given by equations (20), (21), and (22).

V. THROUGHPUT OF BELIEF PROPAGATION DECODED RAPTOR CODES IN THE HIGH SNR REGION

A. Ensemble Bounds on the Iterative Decoding Threshold

We turn to the question of designing a Raptor code for Hybrid ARQ. A design must specify the parity check degree polynomial $\Omega$ as well as the inner code. As our simulation results will show subsequently, schemes based on Raptor codes have superior performance at low SNR over conventional systematic punctured LDPC codes. In fact the throughput of punctured LDPC codes falls off rapidly as the SNR falls to the point where the channel capacity corresponds to the rate of the mother code. No universal $\Omega$ can be found which is capacity achieving over a range of SNRs.

Given the superior performance at low SNR, we will concentrate on the high SNR performance of Raptor codes. In this case puncturing an LDPC code performs better than sending random parity check bits, as in Raptor codes as far as hybrid ARQ throughput is concerned. In fact the performance over such channels may be approximated by the performance over an ideal channel. Consideration of transmission over an ideal channel is also important because lower bounds for ensemble code performance are determined for Raptor codes and LDPC codes once throughput is given for the ideal channel. We BEC in by discussing this ensemble lower bound.

The lower bound on ensemble performance of infinite length graph based codes provides a limit on the iterative decoding threshold. (It is well defined in cases where worse channels can be obtained by physical degradation of the channel with a smaller parameter value.)

We turn to the bound itself which applies to any physically degradable BISC:

Theorem 2 (Khandekar): Suppose the Binary Erasure Channel with erasure probability p is within the iterative decoding threshold for an ensemble of codes. Then so is any other BISC with Bhattacharya parameter $$\mathbb{E}\left[e^{-\frac{z}{2}}\right] = \gamma \le p.$$

The above bound can be used to determine a lower bound on the iterative decoding threshold for Raptor codes over a Binary Input Channel with AWGN noise. To do so first consider the Raptor codes being used over an ideal channel. Take its outer code to be an ensemble of length n regular LDPG codes with rate $R_L$ and with an iterative decoding threshold $p_o$ for the binary erasure channel.

Definition 2: Define $\kappa_{106}(p_o)$ to be the Raptor threshold rate. This is the smallest fraction of LT symbols per LDPC symbol needed to determine all but a fraction $P_o$ of the LDPC symbols in the limit as $n \to \infty$.

Now suppose that the same Raptor code is used over a BIAWGN channel with Bhattacharya noise γSince the fraction of parity check symbols must be inflated by $1/(1-p)$ for a BEC with parameter p, Theorem 2 implies that we will be within the iterative decoding threshold for this channel provided we transmit at least $$\kappa_\Omega^\gamma = \frac{\kappa_\Omega(p_0)}{(1-\gamma)} \tag{35}$$

LT parity check symbols per LDPC symbol. The rate of the Raptor code in bits per channel therefore exceeds $$R_{Raptor} = \frac{R_L}{\kappa_\Omega^\gamma} = \frac{R_L(1-\gamma)}{\kappa_\Omega(p_0)} \tag{36}$$

which depends only on the Raptor threshold rate and the Bhattacharya noise of the channel.

(36) may be taken as an approximate lower bound to the throughput which can be achieved by using Hybrid ARQ if the channel is fixed to be BIAWGN with Bhattacharya noise γ. It may be an overestimate for finite length codes as they typically have worse performance than their corresponding infinite length ensembles. This is balanced by the fact that the codeword is transmitted piecemeal with an attempt at decoding at each stage in Hybrid ARQ. This obviously gives better throughput performance than one shot decoding of the complete codeword.

As we mentioned earlier we thus see that this lower bound is determined via the performance of the Raptor code over an ideal channel. It should be noted that Etesami and Shokrollahi, supra, have obtained a corresponding upper bound for the performance of Raptor codes (and other graph based codes). This too leads to a performance bound in connection with a further BEC. Its erasure probability is given as $1-E[\tanh(Z)/2]$ where Z is the distribution of the Log Likelihood Ratio between 0 and 1 over the channel given that 0 was transmitted. This bound coincides with the lower bound for an ideal channel. Furthermore this bound is also determined once $\kappa_\Omega(p_0)$ is given.

We now tam to obtaining an upper bound, over the ideal channel, for the throughput for the set of design choices $(p_0, \Omega)$ where $p_0$ is the iterative decoding threshold for the BEC for ensembles of the outer code (not necessarily LDPC) and Q is the degree polynomial for the LT parity checks.

B. Linear Programming Bounds

To fix things we will consider Raptor codes with a regular LDPC inner code. Suppose the variable and check node edge distribution polynomials of the LDPC code are $\lambda(x)$, $w(x)$. For ensembles of graph based codes, recall that the iterative decoding threshold $P_0$ for the BEC can be determined as the largest p for which (23) has no other root than $x=0$ in $[0, p]$ as. A punctured version of an LDPG code ensemble can thus attain a maximum throughput $$T_{Punc\ LDPC} := \text{Information bits per bit sent} = \frac{R_L}{(1.0 - p_0)}$$

over an ideal channel.

For Raptor codes the fraction of erased bits $x_0$ remaining after the first round of iterative decoding depends on the choice of degree polynomial ΩIn this case the edge distribution of the check nodes is given by $w(x) = \Omega'(x)$ and the data (LDPC code bits) nodes are Poisson $P(\alpha)$ where a is the average number of bits in a random parity check. Hence $\lambda(x) = e^{\alpha(x-1)}$. $x_0$ is determined as the largest root in $(0,1)$ of $$x = e^{-\kappa\Omega'(1-x)}. \tag{37}$$

andκ is the number of parity checks per LDPC code bit generated. In this case the throughput is $$T_{Raptor} = \frac{R_L}{\kappa}.$$

For Raptor codes we can thus upper bound the throughput performance over an ideal channel for a given underlying LDPC code by minimising$\kappa_\Omega(p_0)$ over all possible choices of $\Omega$. It is actually more convenient to maximise $1/\kappa_\Omega$ as we may then obtain a bound using a linear program. (Other linear programming constructions are described in Etesami and Shokrollahi supra). For convenience we write κ for $\kappa_\Omega$.

As we have just discussed it is necessary for the Raptor ensemble to be BP decodable that, $$x \ge e^{-\kappa\Omega'(1-x)}, x \in [p^0, 1] \tag{38}$$

so that all roots are in $(0, p_0)$. Rewriting this constraint in terms of $1/\kappa$, we may form the objective, $$\max_\Omega \min_x -\frac{\Omega'(1-x)}{\log x}, x \in [p_0, 1] \tag{39}$$

we also have the constraints $\Omega_d \ge 0$ and $\Sigma_d \Omega_d = 1$. Note that (39) is linear in the coefficients and we obtain a finite linear program by working with polynomials of maximum length D and discretising the objective finely over the given interval. The problem is made an LP by using the standard construction, max $v$ subject to $$v \leq -\frac{\Omega'(1-x_k)}{\log x_k}, k = 1, \ldots, K$$

$$1 = \sum_{d=1}^{D} \Omega_d$$

$$\Omega_d \geq 0$$

where $X_k$ are the chosen constraint points, $x_1=p_0, \ldots, x_K=1$.

Practical Raptor codes have further constraints which make the bound tighter. For example a certain fraction of single degree nodes are needed in order to start BP decoding. However this tightens the bound. Indeed the information rate over an ideal channel is reduced as there will be a consequent fraction of single node repeats which are entirely redundant.

Table I are the throughput bounds for 3 Raptor codes using regular LDPC codes as outer codes. Bounds for ensembles of other codes such as irregular LDPC codes and Turbo codes may also be obtained. Fixing $\Omega_1=0.01$

TABLE I

THROUGHPUT LINEAR PROGRAMMING
BOUNDS FOR 3 REGULAR LDPC CODES

Figure 9:
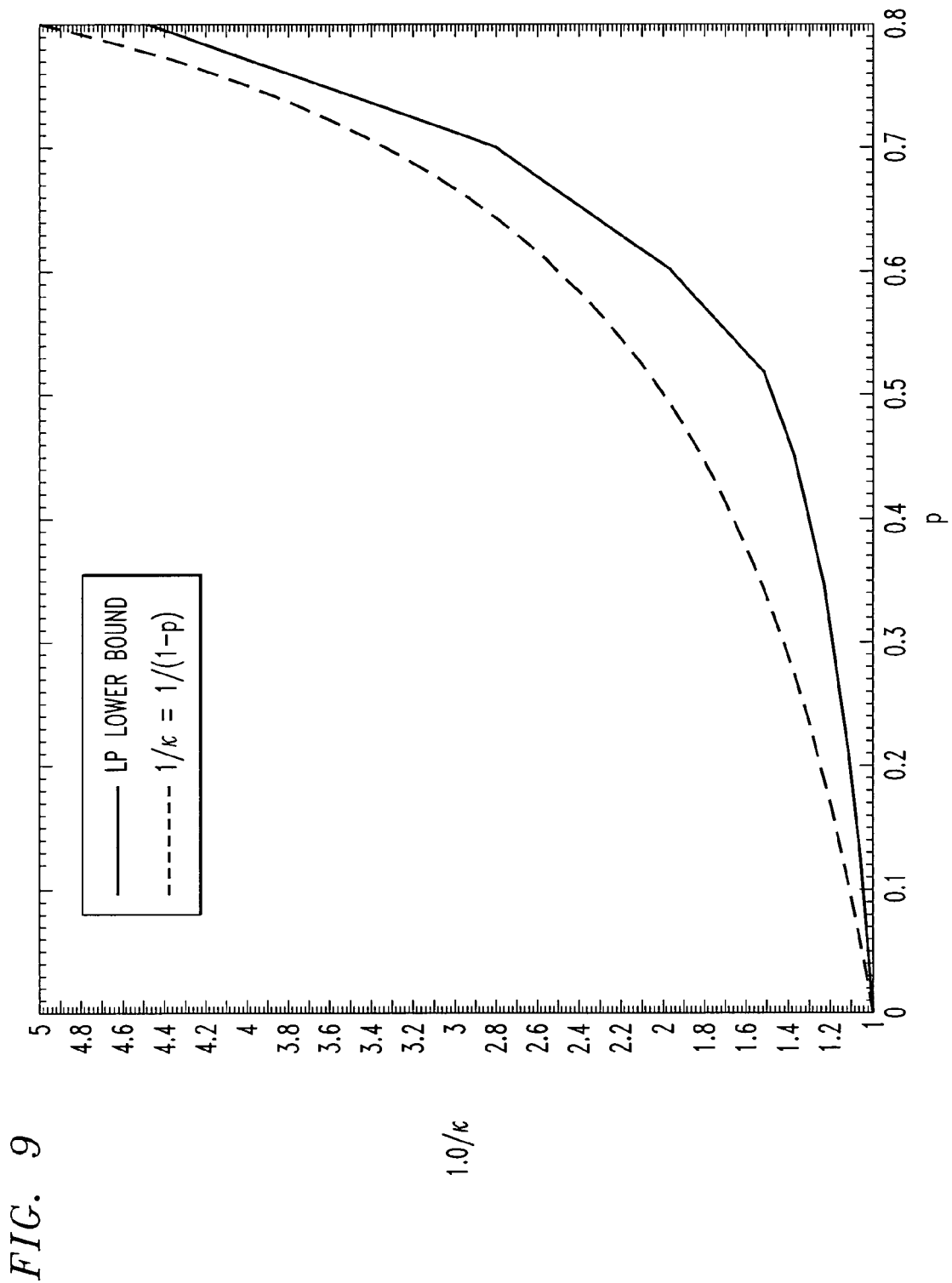

| Code Ensemble | Raptor Throughput Bound |
|---|---|
| (3,5) | 0.607 |
| (3,15) | 0.8699 |
| (3,30) | 0.935 | tightens the bound to be $T_{Raptor}=0.586$ for ensembles of (3,5) codes. In FIG. 9 we present a graph of the throughput bound divided by the code rate of the outer code as a function of the iterative decoding threshold p. As the figure shows the throughput for the Raptor code does not exceed that which would be achieved by puncturing the underlying code. This can never be the case in fact. Indeed suppose we transmit $n(1-p)$ Raptor parity check symbols over an ideal channel. Then we cannot possibly determine more symbols than this under belief propagation decoding (since each Raptor symbol can provide only at most one additional outer code symbol).

In fact for every p>0 we will on the average decode a smaller fraction of symbols than this and FIG. 9 shows the smallest possible gap in performance. This widens with increasing p so that an efficient Raptor design at high SNR must choose p to be low (a high rate code which corrects a small number of erasures). We are then left to see how such designs will perform when the SNR is low.

This picture changes if we replace BP decoding with say joint ML decoding of the Raptor code (including the underlying LDPC precode). In this case capacity can be approached using choices of $\Omega$ which would restrict throughput if employed with BP decoding.

C. Raptor Code Examples

Figure 10:
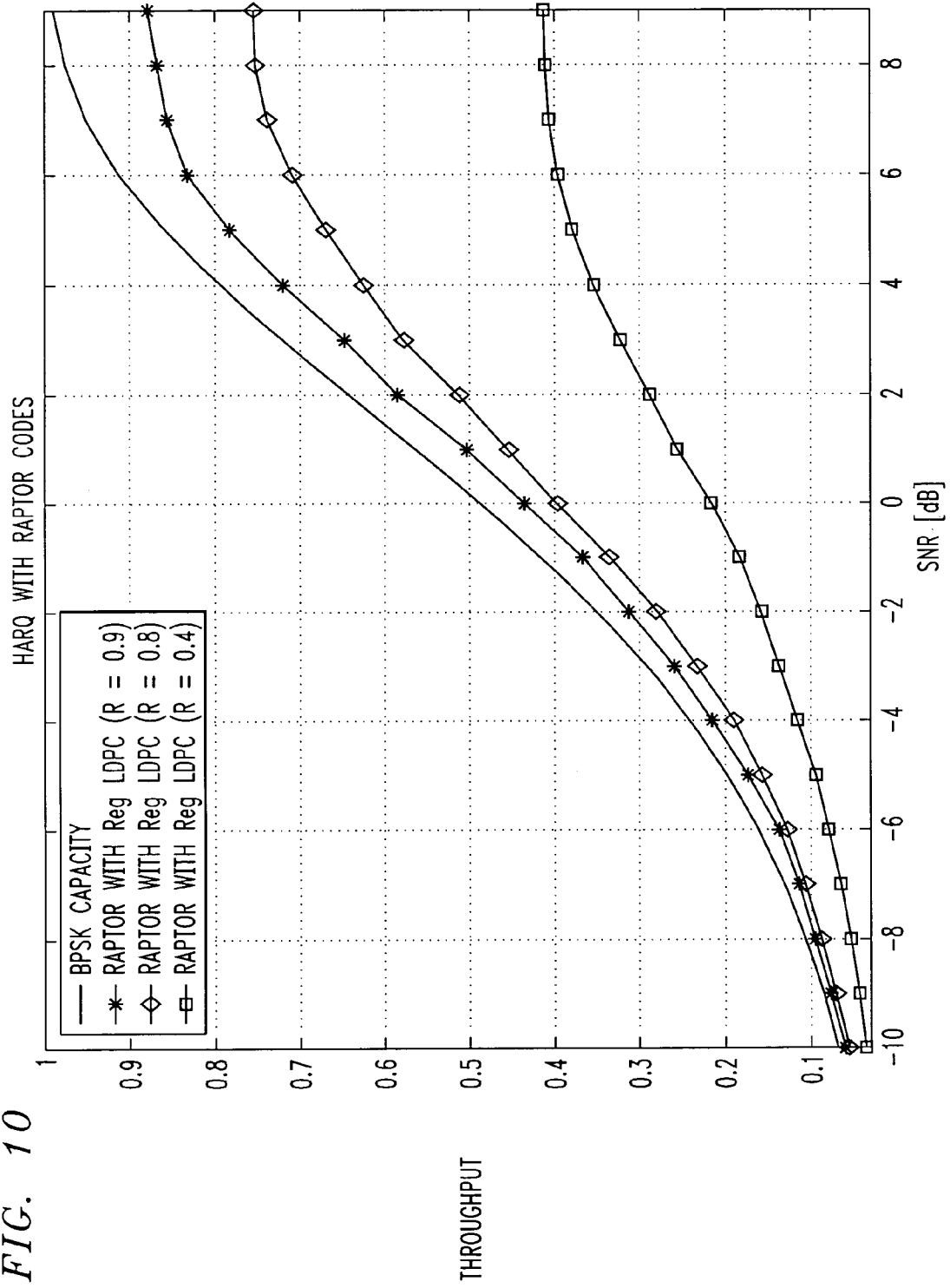

In this section we present simulation results for IR-HARQ based on Raptor codes decoded using BP. In FIG. 10 we show the results for three Raptor codes with the same LT degree distribution $\Omega(x)=0.05x+0.5x^2+0.05x^3+0.25x^4+0.05x^6+0.1x^8$ and three different regular LDPC precodes (with $\lambda(x)=x^2$ and $p(x)=x^4$, $p(x)=^{14}$ and $p(x)+^{29}$). The degree distribution polynomial $\Omega(x)$ was chosen in an ad-hoc manner the choice was based on the results presented by Etesami and Shokrollahi, "Raptor Codes on Symmetric Channels", preprint, 2005. We should note here that similar results are obtained when the degree distribution polynomial $\Omega(x)$ is derived using the linear programming optimization procedure for high SNRs presented in Section V-B.

First, we observe from FIG. 10 that we benefit from using high rate LDPC precodes in Raptor coding schemes. In other words, as we increase the rate of the precode (from 0.4 to 0.8 and then to 0.9) higher throughputs are achievable at all SNRS of interest. (For high SNRs, this can also be concluded from FIG. 9.) Our results show that, among regular LDPC codes, the regular-(3,30) code achieves the satisfactory results and that increasing the LDPC precode rate above 0.9 results in negligible gains or no gains. We also note that the performance curve corresponding to the Raptor code with the regular-(3,30) LDPC precode approaches the capacity to within 1 dB for a wide range of SNRs.

As predicted by the analysis in Section V-B the curves saturate at high SNRs. Again, the predictions are accurate for very long block codes under assumption that the number of BP decoding iterations is sufficiently large. For finite length codes, these bounds can be used in estimating the throughput limits, but they are not tight. For example, the bound on the throughput for the regular-(3,15) LDPC precode from Section V (see Table I) is T=0.8699. The simulation from FIG. 10 shows the Raptor code curve saturates at the throughput roughly equaling T=0.75.

VI. COMPARISON BETWEEN HARQ SCHEMES BASED ON LDPC AND RAPTOR CODES

Figure 11:
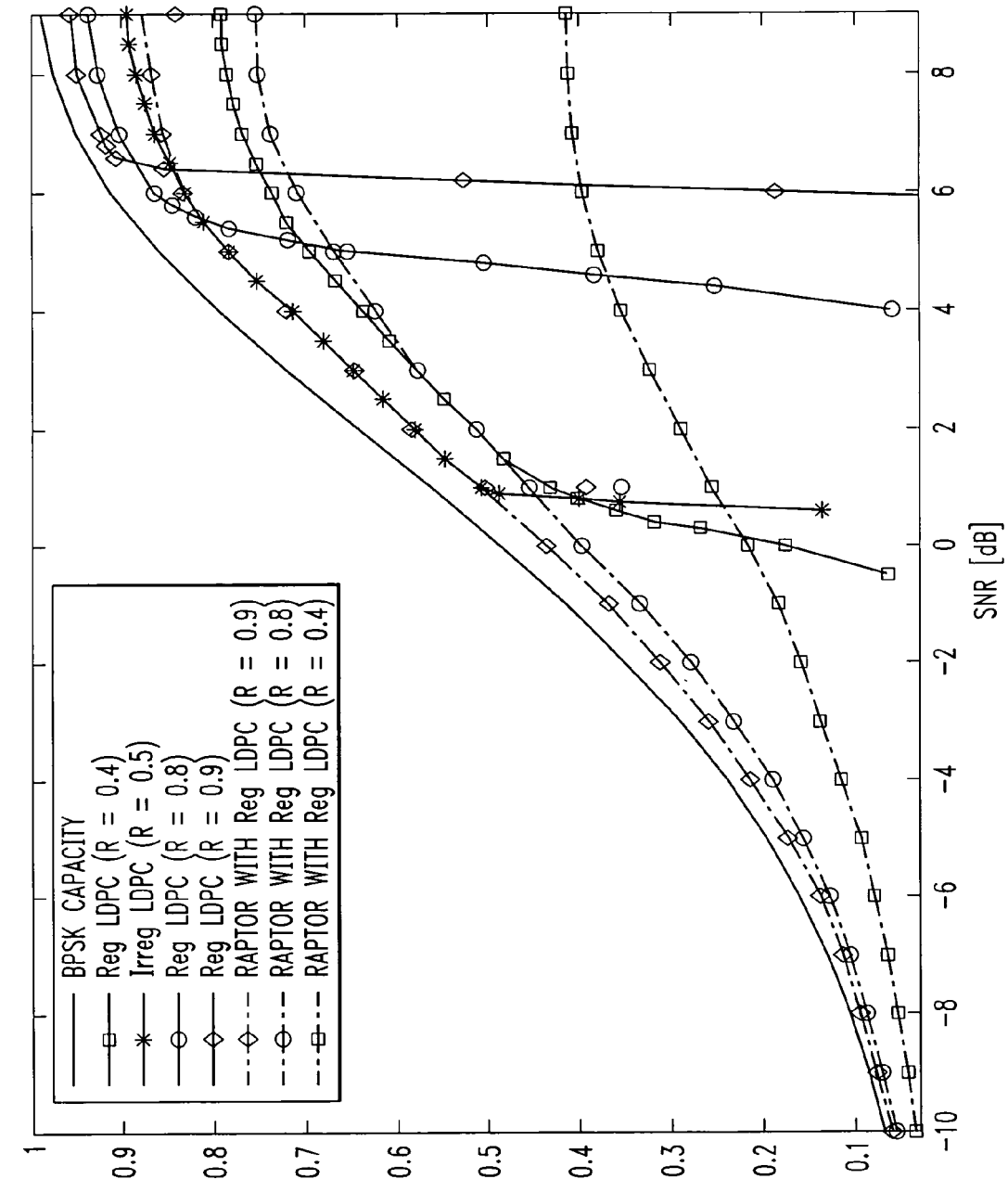

In Section IV we discussed the theoretical results obtained for the two different schemes. We now turn to the comparison between the simulation results for IR-HARQ schemes based on LDPC and Raptor codes. In FIG. 11 we plot the performance of HARQ with several different punctured LDPC codes and Raptor codes. The performances of punctured LDPC codes with three different regular mother codes with $(x)=x^2$ and rates: R =0.4, 0.5 and 0.8 are shown. (For comparison, in the same figure, we plot the Binary Phase Shift Keying capacity and the performance of the punctured LDPC code with the irregular mother code given in FIG. 6). Also shown are three Raptor codes with the same three regular LDPC codes now used as precodes. The LT degree distribution polynomial $\Omega(x)$ in Raptor codes is given by $\Omega(x)=0.05x=0.5x^2+0.05x^3+0.25x^4+0.05x^6+0.1x^8$. We can observe from FIG. 11 that Raptor codes have an obvious advantage at low SNRs. In fact, Raptor codes can be used for signaling at extremely low SNRs and still perform very near the capacity, which is generally difficult to achieve with standard punctured LDPC and turbo codes. For example, when the precode is a regular-(3, 30) LDPC code, the Raptor code simulation shown in FIG. 11 demonstrates that the throughput T =0.1 bits is achieved at SNR about 0.65 dB away from the Shannon limit. Moreover, on the range of throughputs T =0-0.75 the gap to the capacity for this Raptor code is less than 1 dB. Therefore, Raptor codes provide a much broader dynamic range of rates (or SNRs) for HARQ than punctured LDPC codes, and in this respect are more robust than LDPC codes. On the other hand, using LT inner coding instead of puncturing on LDPC codes results in a performance loss in the high-SNR region as we have seen in Section V-B. This is also obvious from FIG. 11. In particular, we can observe from this figure that if operating range of SNRs is guaranteed to be very high (say the SNR is always greater than 7 dB) than it is more beneficial to use punctured LDPC codes with high rate mother codes than Raptor codes. However, if the information about SNR is not available or not reliable it is more advisable to use Raptor coding schemes in IR-HARQ.

Our final comment is on the difference between the encoding/decoding complexities of these schemes. Although the encoding and decoding complexities of Raptor codes are higher than the corresponding complexities of the underlying LDPC codes (and generally higher than the complexities of punctured LDPC codes) they have the property that we only need to encode as many parity bits as we need to send in the initial transmission or in subsequent re-transmission(s). On the other hand, for punctured codes we need to encode all parity bits, even though we may send only a small fraction of them.

APPENDIX I

THE LEFT TAIL OF THE SPECTRUM OF REGULAR LDPC CODE ENSEMBLES

Let $\Lambda_{\kappa,n}$ denote the set of binary $\kappa \times n$ matrices, and $\Lambda_{\kappa,n}^{c,r}$ denote the set of binary $\kappa \times n$ parity-check matrices whose column weights are given by vector $c = (c_1, \ldots, c_n)$ and row weights by $r = (r_1, \ldots, r_\kappa)$. If $c_i = c$, $\forall$ i, and $r_i = r$, $\forall$ i, the code ensemble with parity check matrices $\Lambda_{\kappa,n}^{c,r}$ is referred to as regular ensemble; otherwise, the ensemble is referred to as irregular. We will deal only with the former case and assume that $r > 2$. We define the parameter $\xi$ as $$0 < \zeta = \frac{c}{r} = \frac{k}{n} < 1$$

for regular code ensembles, and denote the set of the corresponding parity check matrices by $\Lambda_n^{\xi,r}$.

Counting the number of codewords of weight w and the form $$1^w 0^{n-w} = \underbrace{11 \ldots 1}_{w \text{ times}} \underbrace{00 \ldots 0}_{n-w \text{ times}}$$

in the ensemble is equivalent to counting the number of matrices in $\Lambda_n^{\xi,r}$ whose row sum over the first w columns is even. Furthermore, a permutation of the columns of such a matrix ensures that the same permutation of $1^w 0^{n-w}$ is then a codeword. Therefore, the average number of weight w codewords in the ensemble is at most $\binom{n}{w}$ times greater of the number of matrices in $\Lambda_n^{\xi,r}$ whose row sum over the first w columns is even.

For $n\theta = w = 1, 2, \ldots, n-1$, define $\Lambda_{n,\theta}^{\xi,r} \subset \Lambda_n^{\xi,r}$ as $$\Lambda_{n,\theta}^{\zeta,r} = \left\{ \Lambda \in \Lambda_n^{\zeta,r} : \sum_{j=1}^{w} \Lambda_{ij} \in \{0, 2, 4, \ldots\} \right\}.$$

By the definition of an ensemble, $$P_{n,\theta}^{\zeta,r} = \frac{|\Lambda_{n,\theta}^{\zeta,r}|}{|\Lambda_n^{\zeta,r}|} \tag{40}$$

is the probability of such a matrix. By constructing an upper bound on $P_{n,\theta}^{\xi,r}$ we will obtain an upper bound on the spectrum of the code itself.

To enumerate $\partial n, \theta^{\xi,r}$ for r even, we further define $L_{n,\theta}^{\xi,r} \subset \Lambda_n^{\xi,r}$ to be the set of binary matrices with the first $m_{o \text{ rows having sum}}$ 0, the next $m_2$ rows having sum 2, and so on, the last $m_r$ rows having sum r. Thus $L_{n,\theta}^{\xi,r}$ contains all possibilities for the first w columns of a matrix in $\Lambda_{n,\theta}^{\xi,r}$ given the row sums in increasing order. Similarly, we define $R_{n,\theta}^{\xi,r}$ to be the set of corresponding matrices complementing $L_{n,\theta}^{\xi,r}$ to form $\Lambda_{n,\theta}^{\xi,r}$ with the first $m_0$ rows summing to r, the next $m_2$ rows summing to r-2 and so on. We have $$|\Lambda_{n,\theta}^{\zeta,r}| = \sum \binom{\zeta n}{m_0 \; m_2 \; \ldots \; m_r} |L_{n,\theta}^{\zeta,r}| |R_{n,\theta}^{\zeta,r}| \tag{41}$$

where the sum is over all feasible combinations of the row sums i.e., $m_0 \; m_2 \ldots m_r$, satisfying $$\sum_j m_{2j} = \zeta n = m \text{ and } \sum_j 2j m_{2j} = \zeta r \theta n = wc. \tag{42}$$

A similar result holds for r odd, with (42) being over even arguments; so that, the final term is for $2j = r-1$ instead of $2j = r$.

To find bounds on $|\Lambda_{n,\theta}^{\xi,r}|$, $|L_{n,\theta}^{\xi,r}|$, and $|R_{n,\theta}^{\xi,r}|$, we will use the following result on the number of zero-one matrices with prescribed column and row-weight. See Litsyn and Shevelev supra. Lemma 1: The number $N_{c,r}$ of zero-one matrices with row weight distributions r and column weight distributions c can be bounded as follows:

$$N_{c,r} \leq \frac{S!}{\prod_i r_i! \prod_j c_j!}, S = \sum_i r_i = \sum_j c_j = nc = mr. \tag{43}$$

Theorem 3 of Litsyn and Shevelev supra provides an asymptotic lower bound for $|\Lambda_n^{\xi,r}|$:

$$|\Lambda_n^{\zeta,r}| \geq C_1 \frac{(nr\zeta)!}{(r!)^{n\zeta}((\zeta r)!)^n} \tag{44}$$

for sufficiently large $n > n_0$, which is of course independent of $\theta$.

We now establish the following theorem:

Theorem 3: For fixed r, c $\in$ N, r even, there is a constant $C_2$, and $n_0$ both independent of $\theta$ such that $$P_{n,\theta}^{r,\zeta} \leq C_2 \frac{1}{\binom{nr\zeta}{n\theta r\zeta}} \sum_m \binom{\zeta n}{m_0 \; \ldots \; m_r} \binom{r}{2}^{m_2} \ldots \binom{r}{r-2}^{m_{r-2}} \tag{45}$$

whenever $n > n_0$. The sum is taken with values constrained as $$m_0 + m_2 + \ldots m_r = \xi n \; 2m_2 + 4m_4 + \ldots + rm_r = \xi \theta r n \tag{46}$$

Proof We first apply Lemma 1 to upper bound $|L_{n,\theta}^{\xi,r}|$ and $|R_{n,\theta}^{\xi,r}|$. Then use (44) to lower bound $|\Lambda_n^{\xi,r}|$ for sufficiently large $n_0$ and all $n > n_0$. The result follows on substituting into (41) and using the definition of $P_{n,\theta}^{r,\xi}$ given in (40)

Again a similar result holds for r odd with the changes indicated above.

We introduce next a simple method for evaluating the sum in (45) based on a set of results from large deviation theory. Let $$p_j \triangleq 2^{-r}\binom{r}{j}, \qquad (47)$$

hence $p = \{p_j\}_{j=0}^{r}$ represents a probability vector. Multiplying both the numerator and denominator of the expression in (45) by $2^{r\zeta n}$, we obtain $$P_{n,\theta}^{r,\zeta} \le C_2 \frac{2^{r\zeta n}}{\binom{nr\zeta}{n\theta r\zeta}} \sum \binom{\zeta n}{m_0 \ldots m_r} p_0^{m_0} p_1^{m_1} \ldots p_r^{m_r}, \qquad (48)$$

where the constraints (46) hold. The expression above can be bounded and its log-asymptotics can be assessed in terms of Sanov's theorem, stated below.

Theorem 4: Let $\{X1, \ldots, X_n\}$ be i.i.d random variables with probability mass function $Q(x)$ over a bounded set of K elements. Let $F \subset P$ be a set of probability distributions. Then $$Q_n(F) = Q_n(f \cap P) \le (n+1)^K 2^{-nD(P^*\|Q)}, \qquad (49)$$

where
$P^* = \arg\min_{P \in F} d(P\|Q)$.

Furthermore, if F is the closure of its interior, then $$\frac{1}{n} \log Q^n(F) \to -D(P^*\|Q).$$

Therefore, the problem of estimating the probability in (12) reduces to finding a probability mass function $q_i$ that minimizes $\Sigma 1_i \log(q_i/p_i)$, such that $$\sum_i q_i = 1 \text{ and } \sum_i i q_i = \theta r, \qquad (50)$$

with probabilities $p_i$ defined in (47). By using the Lagrangian multiplier method, with the multiplier function $$\sum_i q_i \log \frac{q_i}{p_i} + \mu_1 \sum_i q_i + \mu_2 \sum_i i q_i + \mu_3 \sum_i q_{2i+1}, \qquad (51)$$

one can show that the unique optimizing distribution for both r even and r odd is of the form $$q_i^* = \frac{2\binom{r}{i} p^i}{(1+p)^r + (1-p)^r}, \text{ for even values of } i, \qquad (52)$$

and zero for odd values of i, where p is the unique positive root of the equation $$\frac{(1+\rho)^{r-1} + (1-\rho)^{r-1}}{(1+\rho)^r + (1-\rho)^r} = 1 - \theta. \qquad (53)$$

It follows that $$D(q^*\|p) = \log \frac{2_\rho^{\theta r}}{(1+\rho)^r + (1-\rho)^r} + \log G. \qquad (54)$$

In the upper bound for $P_{n,\theta}^{r,\leqq}$ there remains the factor $\binom{nr\leqq}{n\theta r\leqq}$ which we may upper bound using Stirling's formula (see for example [2, p. 530]):

$$\binom{nr\zeta}{n\theta r\zeta} > e^{n\zeta rh(\theta)} \frac{1}{\sqrt{8nr\zeta\theta(1-\theta)}}. \qquad (55)$$

There is a corresponding upper bound for the remaining term in the spectrum, $$\binom{n}{n\theta} < e^{nh(\theta)} \frac{1}{\sqrt{n2\pi\theta(1-\theta)}}. \qquad (56)$$

Using Theorem 3 together with (45), (49), (54), (55), (56), we obtain the following upper bound on the spectrum:

Theorem 5: There is a constant $C_3$ independent of $1 > \theta > 0$ and $n_0$ so that for $n > n_0$ $$\overline{A}_\theta^{[C](n)} \le C_3 \left[\frac{(1+\rho)^r + (1-\rho)^r}{2_\rho^{\theta r}}\right]^{n\zeta} \left[(1-\theta)^{(1-\theta)} \theta^\theta\right]^{n(\zeta r - 1)}, \qquad (57)$$

where p is the unique positive root of (53).

In order to apply the above result to bounding the left tail of the spectrum, we must investigate the behavior of p near 0, which we examine using (53). As $\theta$ approaches 0, so does p with $$\rho^2 = \frac{\theta}{r-1} + O(\theta^2).$$

Since $\binom{r}{2} p^2 = r\theta/2 + O(\theta_2)$, $$\log \left[\frac{1}{2}((1+\rho)^r + (1-\rho)^r)\right]^{n\zeta} [1-\theta]^{n(\zeta r - 1)(1-\theta)} =$$

$$n\theta \left\{\frac{\zeta r}{2} - (1-\theta)(\zeta r - 1) + O(\theta^2)\right\} < 0$$

for all sufficiently small θ and c≧2. We thus have that $$\overline{A}_\theta^{[C](n)} \le C_3 \left[ \frac{\theta^{\zeta\theta r}}{\rho^{\zeta\theta r}\theta^\theta} \right]^n$$

Using our estimate for p for sufficiently small θ there is an ε>0 so that the RHS is upper bounded by $$C_3 \left[ \frac{\theta^{\zeta r}((r-1)(1+\varepsilon))^{\frac{\zeta r}{2}}}{\theta \theta^{r\zeta/2}} \right]^{n\theta} = C_3 [\theta^{(c/2-1)} \cdot ((r-1)(1+\varepsilon))^{c/2}]^{n\theta}. \quad (58)$$

Thus the tail of the spectrum for some 9o >0 is upper bounded by $$\sum_{j=1}^{\lceil n\theta_0 \rceil} \overline{A}_\theta^{[C](n)} < C_3 \sum_{j=1}^{\lceil n\theta_0 \rceil} \left[ \left(\frac{ja}{n}\right)^{c/2-1} \right]^j,$$

where a =[(r−1)(1+ε)]$^{c/(c-2)}$ We now show that this converges to 0 as n→∞ for suitable choice of $\theta_0$. We must choose c≧3 and note that we may show the result for c=3 only as the individual terms decrease monotonically as c is increased provided (ja)/n<1. Also by considering x log x we observe that the sequence ((ja)/n)$^j$ decreases as j increases provided (ja)/n<e$^{-1}$. Thus $$\sum_{j=1}^{\lceil n\theta_0 \rceil} \overline{A}_\theta^{[C](n)} < \sum_{j=1}^{\lceil n\theta_0 \rceil} \left[ \left(\frac{ja}{n}\right)^{c/2-1} \right]^j < (a/n)^{\frac{1}{2}} + (2a)/n + n\theta_0((3a)/n)^{3/2}$$

and so converges to 0 at least as fast as O(n$^{-1/2}$).

The invention claimed is:

1. A method, comprising:
encoding data words of a sequence according to a Raptor-encoding scheme;
transmitting the encoded data words from a transmitter to a receiver such that each encoded data word is transmitted between the same transmitter and receiver; and
receiving feedback signals from the receiver at the transmitter, said feedback being indicative of a statistical measure of transmission channel quality; and
wherein the transmitting is performed at an information transmission rate and a power level, the transmitting being performed such that the information transmission rate or the power level is dynamically responsive to the received feedback signals such that throughput is within 30% of the Shannon limit.

2. The method of claim 1, wherein the transmitting includes increasing the information transmission rate in response to one of the feedback signals indicating an increase in the SNR or a decrease is the symbol erasure rate and decreasing the information transmission rate in response to one of the feedback signals indicating a decrease in the SNR or an increase in the symbol erasure rate.

3. The method of claim 1, wherein the transmitting includes decreasing the power level in response to one of the feedback signals indicating an increase in the SNR or a decrease in the symbol erasure rate and increasing the power level in response to one of the feedback signals indicating a decrease in the SNR or an increase in the symbol erasure rate.

4. The method of claim 1, wherein the encoding further comprises encoding the data words according to a low-density parity-encoding scheme.

5. The method of claim 1, wherein said statistical measure comprises either a signal-to-noise ratio at the receiver or a bit erasure rate at the receiver.

6. The method of claim 1, further comprising:
receiving at the transmitter acknowledgement signals from the receiver, each acknowledgement signal indicating that a corresponding set of the encoded data words has been decoded; and
wherein the transmitting of another set of the encoded data words is performed in response to receiving at the transmitter one of the acknowledgement signals indicating that a previously transmitted set of the Raptor encoded data words has been decoded at the receiver.

7. The method of claim 1 for transmitting a Raptor encoded LDPC code signal wherein during the j$^{th}$ transmission interval associated with a bit frame the signal intensity and the number of bits sent is within 25% of a value derivable from the formula:

$$R_j(1-\gamma(j)) > \frac{c_0}{\Pi_\Omega} - \sum_{i=1}^{j-1} R_i(1-\gamma(i))$$

with $$\Pi_\Omega = \min_\theta \frac{P(\theta)}{\theta}$$

and $$P(\theta) = \sum_d \Omega_d \sum_{\substack{j=1 \\ j\,odd}}^{d} \binom{d}{j} \theta^j (1-\theta)^{d-j}$$

where $R_j$ is the number of summed bits transmitted in said jth interval, γ(j) is the Bhattacharyya noise on the channel during said jth interval, $c_0$ is the ensemble spectrum parameter, p(θ) is the probability of obtaining a 1 for said transmission in said Raptor code for an underlying codeword of fractional weight θ and $\Omega_d$ is a probability associated with choice of d bits to include in said sum.

8. The method of claim 7 wherein said Raptor encoded signal is transmitted over a communication channel when said channel is too noisy to allow transmission of LDPC encoded messages.

9. A method, comprising:
encoding data words of a sequence according to LDPC encoding scheme;
transmitting the encoded data words from a transmitter to a receiver such that said encoded data word is transmitted between the same transmitter and receiver; and receiving a feedback signal at the transmitter from the receiver, said feedback signal being indicative of a statistical measure of transmission channel quality erasure rate; and
wherein the transmitting is performed at an information transmission rate and a power level, the transmitting being performed such that the information transmission rate or the power level is dynamically responsive to the received feedback signals such that throughput is within 30% of the Shannon limit.

10. The method of claim 9 wherein the transmitting includes increasing the information transmission rate in response to one of the feedback signals indicating an increase in the SNR or decrease in the symbol erasure rate and decreasing the information transmission rate in response to one of the feedback signals indicating a decrease in the SNR or increase of the symbol erasure rate.

11. The method of claim 9, wherein the transmitting includes decreasing the power level in response to one of the feedback signals indicating an increase in the SNR or decrease in the symbol erasure rate and increasing the power level in response to one of the feedback signals indicating a decrease in the SNR or increase in the symbol erasure rate.

12. The method of claim 9, wherein the encoding further comprises encoding the data words according to a low-density parity-encoding scheme.

13. The method of claim 9, wherein said statistical measure comprises either a signal-to-noise ratio at the receiver or a bit erasure rate at the receiver.

14. The method of claim 9, further comprising:
receiving at the transmitter acknowledgement signals from the receiver, each acknowledgement signal indicating that a corresponding set of the encoded data words has been decoded; and
wherein the transmitting of another set of the encoded data words is performed in response to receiving at the transmitter one of the acknowledgement signals indicating that a previously transmitted set of the Raptor encoded data words has been decoded at the receiver.

15. The method of claim 9, wherein the intensity of said signal during a $j^{th}$ interval of a series of transmission time intervals and the fraction of bits of said LDPC encoded signal that is transmitted during the $j^{th}$ interval of said series of intervals comprise values that are within ±25% of such values derivable from the formula:

$$\alpha_j > 1 - e^{-C_0} - \sum_{i=1}^{j-1} \alpha(i)(1 - \gamma(i))$$

where $\alpha_j$ is the fraction of bits sent in said $j^{th}$ interval, $c_0$ is the ensemble spectrum and $\gamma(j)$ is the Bhattacharyya noise after the $J^{th}$ transmission interval.

16. A method, comprising:
encoding some of the data words of a sequence according to a Raptor-encoding scheme;
encoding others of the data words of the same sequence according to a punctured turbo or a punctured LDPC encoding scheme;
transmitting the encoded data words from a transmitter to a receiver such that each encoded data word is transmitted between the same transmitter and receiver;
receiving feedback signals from the receiver at the transmitter, each feedback signal being indicative of either a signal-to-noise ratio (SNR) at the receiver or a symbol erasure rate at the receiver; and
wherein the transmitting includes switching between transmitting of the punctured turbo or LDPC encoded data words and transmitting of the Raptor-encoded data words in a manner that is dynamically responsive to the received feedback signals.

17. The method of claim 16, wherein the switching includes transmitting the Raptor-encoded ones of the data words in response to the feedback signals and indicating that a SNR at the receiver is below preselected threshold or indicating that an erasure rate at the receiver is above a preselected threshold.

18. The method of claim 16, wherein the switching includes transmitting the punctured LDPC encoded ones of the data words in response to the feedback signals indicating that a SNR at the receiver is above a preselected threshold or indicating that an erasure rate at the receiver is below a preselected threshold.

19. A method of transmitting a message comprising propagating a signal carrying said message so that said signal is capable of being received and decoded wherein said signal comprises LDPC or Turbo codewords encoded by forming individual encoded bits by choosing d bits in number from said codewords and summing said d bits to form said individual encoded bits wherein for said summing the number, d, of bits chosen is in accordance with a probability assigned to the value, d, wherein said probability, $\Omega_d$, is within A) ±30% for values of 0.05 or less and within B) ±10% for values of greater than 0.05, said probability, derivable from the formula $$K \leq -\frac{\Omega'(1-X)}{\log X} \text{ with } \Omega'(X) = \sum_{d=1}^{D} d\Omega_d X^{(d-1)}$$

where X is a fraction on average in the interval from p to 1 inclusive and p is the maximum number of bit erasures detectable from said LDPC code during said decoding.

20. The method of claim 19 wherein said values of $\Omega_d$ are derived using linear programming.

21. The method of claim 19 wherein said derivable value is obtained by a choice of at least 100 values of X.

22. The method of claim 21 wherein at least 1000 values of X are employed.

* * * * *

UNITED STATES PATENT AND TRADEMARK OFFICE
CERTIFICATE OF CORRECTION

PATENT NO. : 7,669,103 B2
APPLICATION NO. : 11/418158
DATED : February 23, 2010
INVENTOR(S) : Soljanin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this

Twenty-eighth Day of December, 2010

David J. Kappos
*Director of the United States Patent and Trademark Office*